US008873348B2

(12) United States Patent
Hipwell et al.

(10) Patent No.: US 8,873,348 B2
(45) Date of Patent: Oct. 28, 2014

(54) METHOD AND APPARATUS FOR COUPLING A LASER DIODE TO A MAGNETIC WRITER

(71) Applicant: Seagate Technology LLC, Cupertino, CA (US)

(72) Inventors: Roger L. Hipwell, Eden Prairie, MN (US); Yongjun Zhao, Eden Prairie, MN (US); Mark Ostrowski, Lakeville, MN (US); Andrew D. Habermas, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/097,482

(22) Filed: Dec. 5, 2013

(65) Prior Publication Data
US 2014/0091130 A1 Apr. 3, 2014

Related U.S. Application Data

(62) Division of application No. 13/277,483, filed on Oct. 20, 2011, now Pat. No. 8,611,193.

(60) Provisional application No. 61/394,952, filed on Oct. 20, 2010.

(51) Int. Cl.
G11B 11/00 (2006.01)
G11B 5/31 (2006.01)
G11B 5/105 (2006.01)
G11B 5/127 (2006.01)
G11B 5/00 (2006.01)

(52) U.S. Cl.
CPC ........ *G11B 5/127* (2013.01); *G11B 2005/0021* (2013.01); *G11B 5/314* (2013.01); *G11B 5/105* (2013.01)

USPC ............................. 369/13.26; 369/13.32

(58) Field of Classification Search
USPC .......... 369/13.26, 13.32, 13.33, 13.17, 13.24, 369/13.01, 13.02, 112.27; 365/151, 148; 977/943; 427/58; 216/13; 228/256; 257/98, 418, 415, 88, 91, 40, 637
See application file for complete search history.

(56) References Cited

U.S. PATENT DOCUMENTS

| 5,642,336 | A | 6/1997 | Albertini et al. | |
|---|---|---|---|---|
| 7,361,974 | B2 * | 4/2008 | Graf | 257/637 |
| 7,538,978 | B2 | 5/2009 | Sato et al. | |
| 7,986,592 | B2 | 7/2011 | Hirano et al. | |
| 8,065,786 | B2 | 11/2011 | Shimazawa et al. | |
| 8,345,517 | B2 | 1/2013 | Hurley et al. | |
| 8,391,107 | B2 | 3/2013 | Gage et al. | |
| 8,406,089 | B2 | 3/2013 | Sasaki et al. | |
| 8,587,989 | B2 * | 11/2013 | Manning et al. | 365/151 |
| 8,611,193 | B2 * | 12/2013 | Hipwell et al. | 369/13.26 |

OTHER PUBLICATIONS

File History for U.S. Appl. No. 13/277,483.

* cited by examiner

*Primary Examiner* — Ali Neyzari
(74) *Attorney, Agent, or Firm* — Hollingsworth Davis, LLC

(57) ABSTRACT

A write head includes a cavity configured to couple a laser diode to the write head. A bottom of the cavity includes a heat conductive element configured to contact the laser diode, a plurality of thermal studs disposed below the heat conductive element, and a substrate disposed below the thermal studs. The heat conductive element, thermal studs, and substrate are thermally coupled to draw heat from the laser diode.

19 Claims, 21 Drawing Sheets

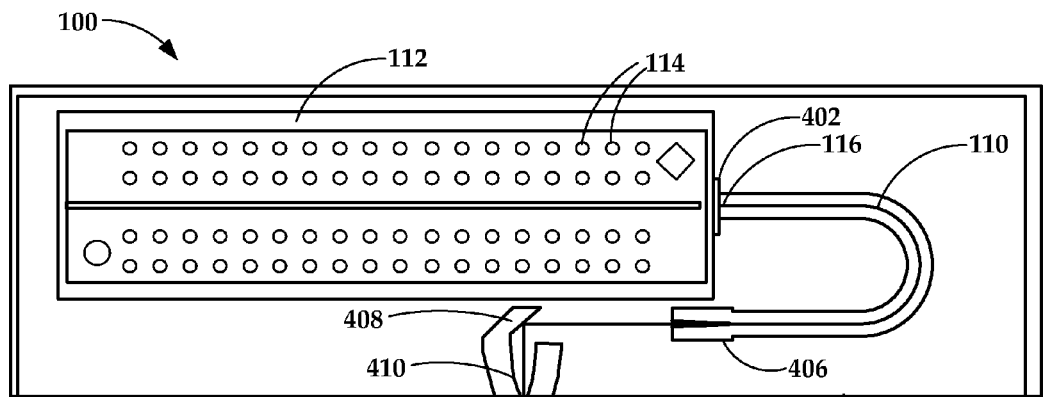
FIG. 4A
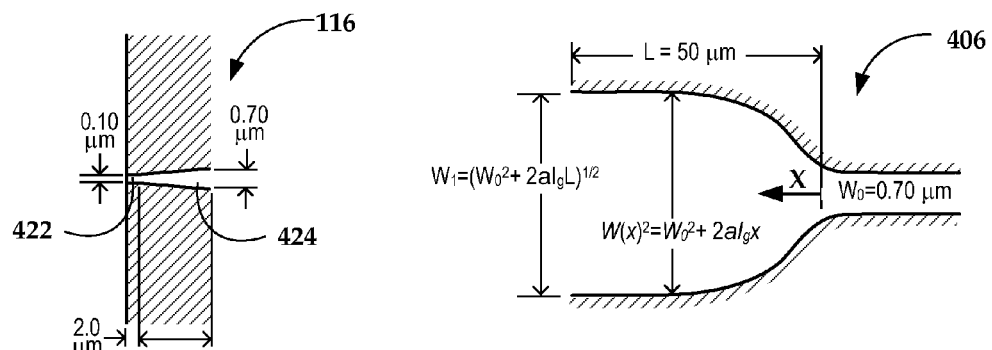
FIG. 4B
FIG. 4C
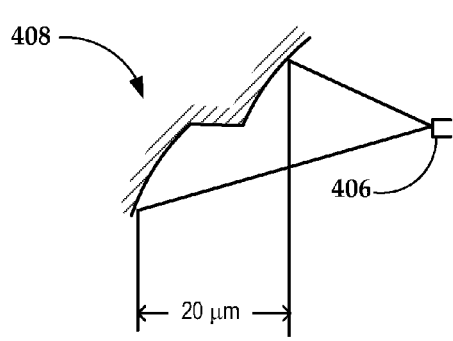
FIG. 4D
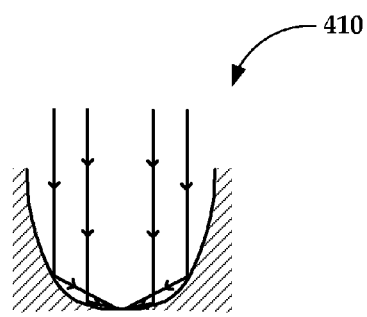
FIG. 4E

METHOD AND APPARATUS FOR COUPLING A LASER DIODE TO A MAGNETIC WRITER

CROSS REFERENCE TO RELATED APPLICATIONS

This application is a divisional of U.S. patent application Ser. No. 13/277,483, filed 20 Oct. 2011, which claims the benefit of Provisional Application No. 61/394,952, filed 20 Oct. 2010, the contents of which are incorporated herein by reference in their entirety.

SUMMARY

Various embodiments described herein are generally directed to methods, systems, and apparatuses that facilitate coupling a laser diode to a magnetic writer. In one embodiment, a magnetic writer includes a cavity configured to couple a laser diode to the magnetic writer. A bottom of the cavity includes a heat conductive element configured to contact the laser diode, a plurality of thermal studs disposed below the heat conductive element, and a substrate disposed below the thermal studs. The heat conductive element, thermal studs, and substrate are thermally coupled to draw heat from the laser diode.

In another embodiment, a magnetic writer includes a cavity configured to couple a laser diode to the magnetic writer. The cavity includes a waveguide coupler configured for optical coupling of a waveguide of the magnetic writer to an output of the laser diode, a plurality of solder bumps on a bottom of the cavity configured to electrically couple the laser diode to the writer, and at least one mechanical stopper disposed in the cavity. The mechanical stopper facilitates vertical alignment of the output of the laser diode to the waveguide coupler in response to a reflow of the solder bumps.

In another embodiment, a method involves forming, in order on a substrate, a plurality of thermal studs, a shield, an electrical insulation layer, and a plurality of electrodes. A sacrificial fill feature is formed on the electrodes, the sacrificial fill feature defining a cavity. Optical layers are deposited around the sacrificial fill feature, and the sacrificial fill feature is removed to define the cavity.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIG. 4A is an end view illustrating various features of a trailing edge of a slider assembly according to an example embodiment;

FIGS. 4B-4E are schematic diagrams illustrating optical features of the slider assembly shown in FIG. 4A;

DETAILED DESCRIPTION

Figure 1:
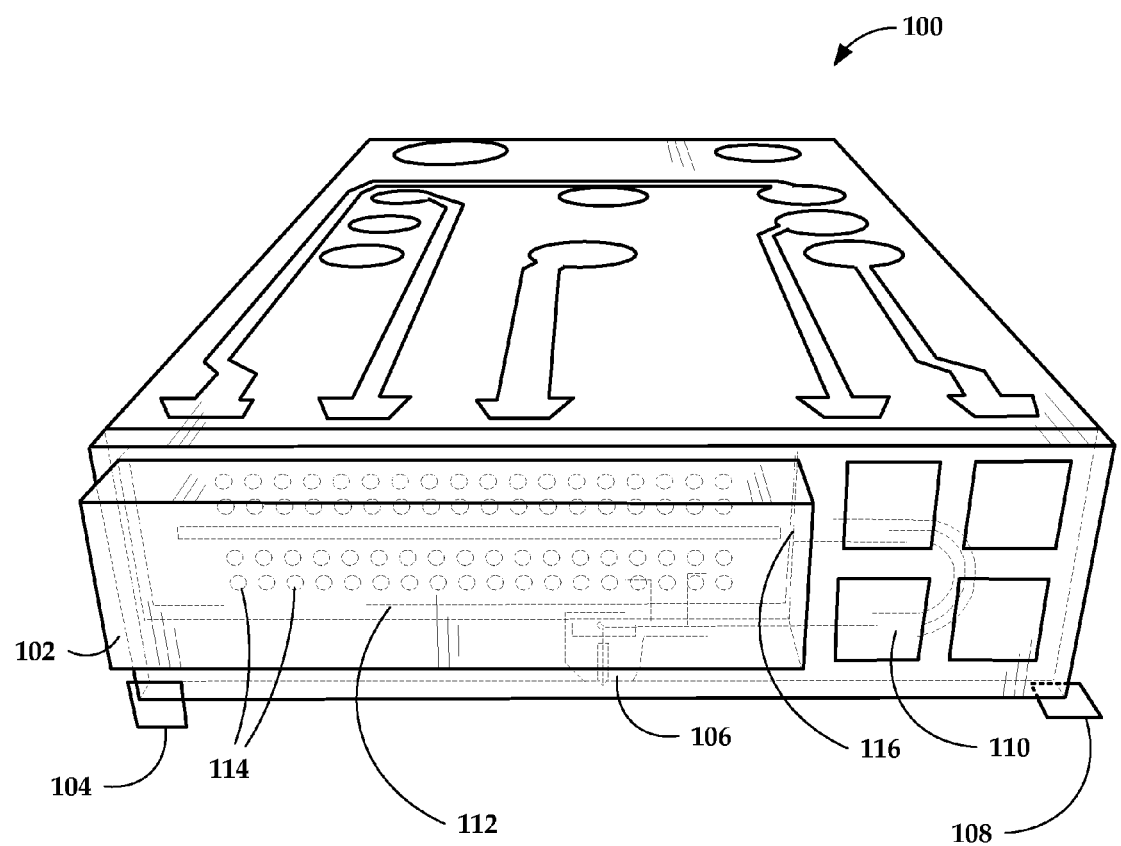
FIG. 1 is a perspective view of a laser-in-slider device according to an example embodiment.

The present disclosure is generally directed to read-write heads used in magnetic recording devices such as hard drives. In particular, this disclosure relates to heat assisted magnetic recording (HAMR), which is one technique used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include features for delivering electromagnetic energy to heat a small media area at the same time a write head applies a magnetic field to the media fore recording.

One way to achieve a tiny confined hot spot is to use an optical near-field transducer (NFT), such as a plasmonic optical antenna or an aperture, located near an air bearing surface of a hard drive slider. Light may be launched from a light source (e.g., a laser diode) into optics integrated into a slider. An example of such integrated optics includes a waveguide formed from core and cladding layers with high contrast between respective refractive indices. Light propagating in the waveguide may be directed to an optical focusing element, such as a planar solid immersion mirror (PSIM). The PSIM may which may concentrate the energy into a NFT. The NFT causes the energy to be delivered to the media in a very small spot.

A waveguide, NFT, and PSIM are examples of integrated optical devices that are formed within the slider. The field of integrated optics generally relates to the construction of optics devices on substrates, sometimes in combination with electronic components, to produce functional systems or subsystems. For example, light may be transferred between components via waveguides that are built up on a substrate using layer deposition techniques. These waveguides may be formed as a layer of materials, with a middle core layer having a relatively high refractive index, and top/bottom cladding layers of relatively low refractive index. Other optical components may be formed in similar fashion, including the NFT and PSIM discussed above.

In a HAMR slider, light is launched into these integrated optics components from a light source such as a laser diode. One way to launch light into a slider is from an externally mounted laser via a grating coupler fabricated in a slider, called free space light delivery. Another way is to place a laser light source, such as a laser diode, into the slider, called laser-in-slider light delivery. Laser-in-slider light delivery can be integrated at a wafer level and may be suitable for mass production.

Even though laser-in-slider light delivery may be a prime candidate for mass production, there are many challenges in producing such devices. For example, while many small-scale electromagnetic and mechanical features can be formed using techniques developed and refined over the years for forming highly complex electronics (e.g., processors), a HAMR device must also integrate optical devices into these assemblies. Further, a separately formed laser diode may need to be assembled to the slider, required alignment tolerances on the order of tenths of a micrometer.

In reference now to FIG. 1, a perspective view illustrates various features of a laser-in-slider device 100 according to an example embodiment. In this example, an edge-emitting laser diode 102 is integrated into a trailing edge surface 104 of the slider 100. The laser diode 102 is proximate to a HAMR read/write head 106, which has one edge on an air bearing surface 108 of the slider 100. The air bearing surface 108 is held proximate to a moving media surface (not shown) during device operation. The laser diode 102 provides electromagnetic energy to heat the media surface at a point near to the read/write head 106. Optical coupling components, such as a waveguide 110, are formed integrally within the slider device 100 to deliver light from the laser 102 to the media.

In this example, the laser diode 102 is approximately 500 µm long, 125 µm wide (vertical dimension in the orientation of FIG. 1), and 100 µm tall. The laser diode 102 is recessed in a cavity 112 formed in the trailing surface 104 of the slider 100. This cavity 112 may be formed such that there is a gap (e.g., approximately 5-10 µm in width) surrounding the laser 102 to allow for tolerance adjustment during assembly. The bottom of the cavity includes solder bumps 114 that interface with corresponding bumps/pads formed on the laser 102. These solder bumps 114 facilitate bonding the laser 102 to the slider 100, provide electrical connectivity for the laser 102, and may provide other functions (e.g., heat sinking the laser 102).

During assembly, the laser 102 is precisely aligned with the waveguide 110 to ensure sufficient energy is delivered to the media. At an optical coupling region, the laser 102 includes an output facet that is aligned to launch light into an input optical coupler 116 of the waveguide 110. The input optical coupler 116 may be formed in a sidewall of the cavity 112. In one embodiment, the cavity 112 may include a narrow gap (e.g., approximately 0.25-1.0 µm) between the input optical coupler 116 and the output facet of the laser 102 to facilitate alignment therebetween.

Figure 2A:
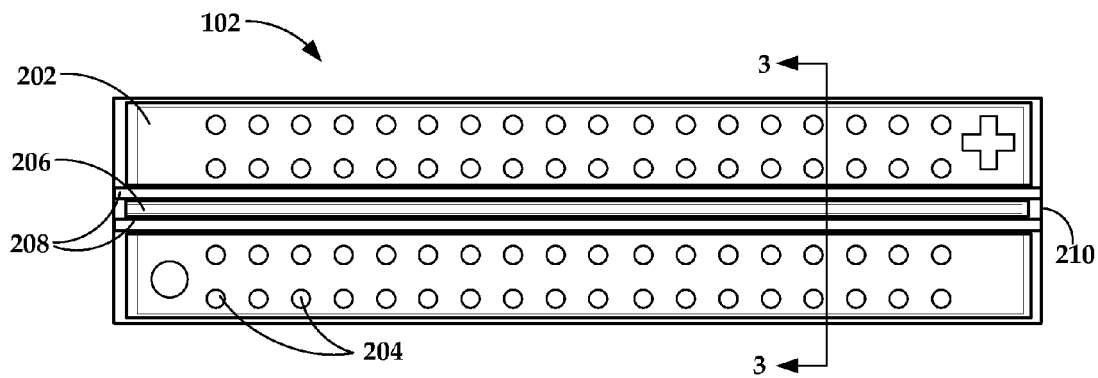
FIGS. 2A and 2B are respective bottom and perspective views showing electrical and optical interface features of the laser diode according to an example embodiment.
Figure 2B:
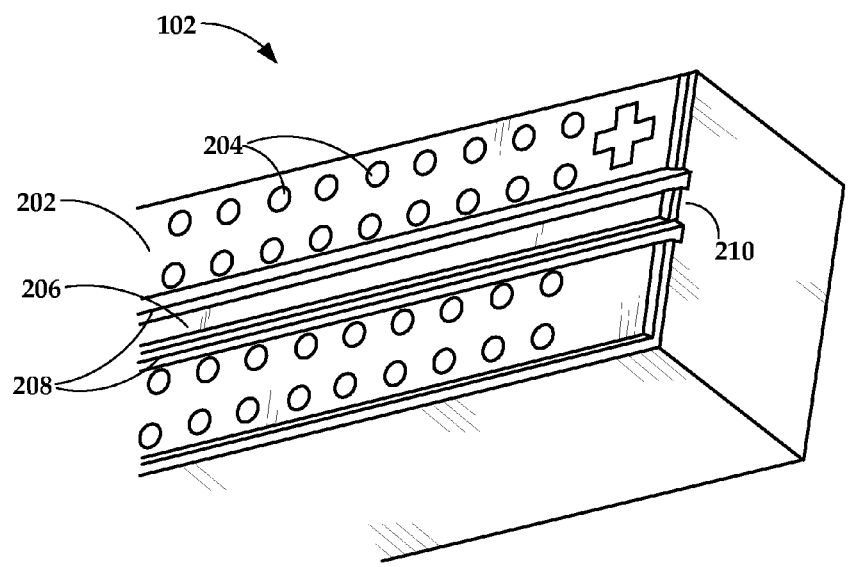
Figure 3:
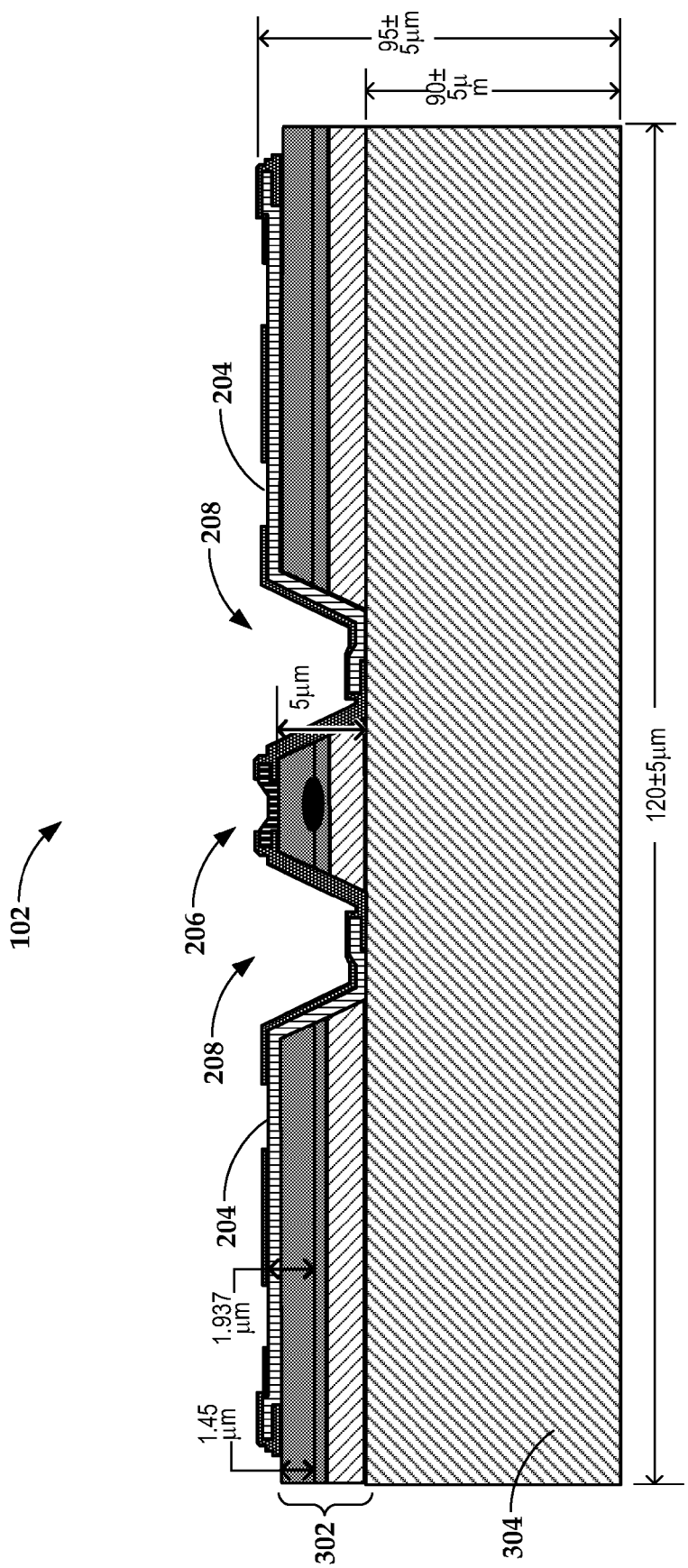
FIG. 3 is a cross sectional view of a laser diode according to an example embodiment.

A more detailed view of alignment features of the edge-emitting laser diode 102 are shown in FIGS. 2A, 2B, and 3. In particular FIGS. 2A and 2B are respective bottom and perspective views showing electrical and optical interface features of the laser diode 102, and FIG. 3 is a cross sectional view of the laser 102 across section line 3-3 shown in FIG. 2A. The lower surface 202 of the laser 102 includes a plurality of solder pads 204 configured to interface with the solder bumps (e.g., bumps 114 in FIG. 1) on the slider device 100. A centrally disposed stripe 206 is surrounded on either side by grooves 208. The laser 102 includes an output facet 210 on one end that launches light into an input of waveguide (e.g., input coupler 116 of waveguide 110 shown in FIG. 1) for delivery to recording media.

As seen in FIG. 3, the solder pads 204 and stripe 206 may form an anode and cathode of the laser 102, and be coupled to junction layers 302 and a substrate 304. The junction layers 302 form the quantum well of the laser 102. The solder pads 204 and stripe 206 are used to electrically couple the laser 102 to the slider assembly 100, e.g., via solder bumps therebetween that are reflowed after mechanical assembly. The stripe 206 may also provide heat sinking for the laser 102. The dimensions shown in FIG. 3 are provided for purposes of illustrating the general scale of the laser 102 and associated slider, and not intended to limit the various embodiments described herein.

In reference now to FIGS. 4A-4E, additional front views illustrates various features of a trailing edge of the slider assembly 100 that mates with an edge-emitting laser diode (e.g., laser diode 102). The cavity 112, solder bumps 114, waveguide input coupler 116, and waveguide 110 previously discussed can be seen in FIG. 4A. Further, a gap 402 may be located in the cavity 112 proximate to an output facet of a side-firing laser. The edge of the laser rests against the edges of this gap 402 and helps align the output facet with a coupler 116 of the waveguide 110.

The coupler 116 is seen in more detail in FIG. 4B. Generally, light is launched into a first end 422 and enters the core of the waveguide via reverse taper 424. Various example dimensions of coupler features are shown in FIG. 4B. It is to be understood that these dimensions, as well as example dimensions shown elsewhere herein, are provided for purposes of illustration and not of limitation, Referring again to FIG. 4A, light propagates through the waveguide 110 where it exits at a beam expander 406, is directed to a collimating PSIM 408 (e.g., a split parabolic collimator) to a parabolic focusing PSIM 410, the focused light exiting the slider 100 at the air bearing surface. Additional details (as well as example dimensions) of the beam expander 406, collimating PSIM 408, and focusing PSIM 410, are shown in the detailed views of FIGS. 4C-4E, respectively.

Figure 5:
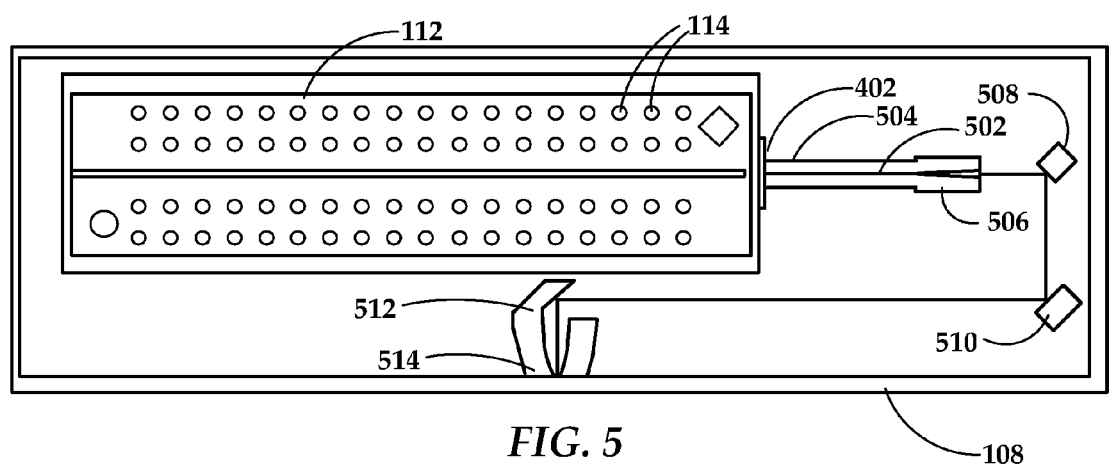
FIG. 5 is an end view illustrating various features of a trailing edge of a slider assembly according to an alternate embodiment.

A configuration of a slider trailing edge according to an alternate embodiment is shown in FIG. 5. In this example, the laser may interface with a cavity 112, solder bumps 114, and output facet gap 402 as previously described. However, unlike the previously illustrated curved waveguide 110, the present example uses a series of mirrors 508, 510, and 512 to guide the light to the air bearing surface 108. The laser may launch light into a coupler 504 (similar to coupler 116 seen in FIGS. 4A-4B) of a straight waveguide 502. Light exits the waveguide 502 via beam expander 506, where, through free-space propagation, it is directed by mirrors 508, 510, and 512 to focusing PSIM 514. Mirrors 508 and 512 may be configured as split parabolic collimators (e.g., similar to collimating PSIM 408 seen in FIGS. 4A and 4D). Mirror 510 may be configured as an elliptical mirror, e.g., elliptical PSIM. Focusing mirror 514 may be a focusing PSIM, (e.g., similar to parabolic focusing PSIM 410 shown in FIGS. 4A and 4E).

In the discussion that follows, processes are described for fabricating HAMR read/write heads with integrated optics such as those described above. The disclosed processes include several solutions for slider integration of edge-emitting lasers (such as the embodiments shown in FIGS. 2A, 2B, and 3) and surface-emitting lasers. Examples of the latter include vertical cavity surface emitting lasers, (VCSEL). The integration methods may involve wafer and/or bar-level laser attach, and are intended to minimize impacts on the read/write head design options. In addition, various details are disclosed regarding the wafer processing.

Four different processes of integrating laser diodes into heat-assisted magnetic recording (HAMR) read/write heads are disclosed herein. Each processing variation may include at least three read/write head fabrication phases: (1) Wafer Processing, in which the transducer reader, writer, and optical integration components are formed; (2) Slider Processing, in which the wafer is sliced in to bars and processed to create a precise air-bearing surface and top-bond-pad electrical interconnects, and (3) Assembly (or HGA—Head-Gimbal Assembly), which in this case may include laser assembly. Each process has its own benefits and tradeoffs, and may utilize unique sub-processes corresponding each of the three phases.

Figure 6:
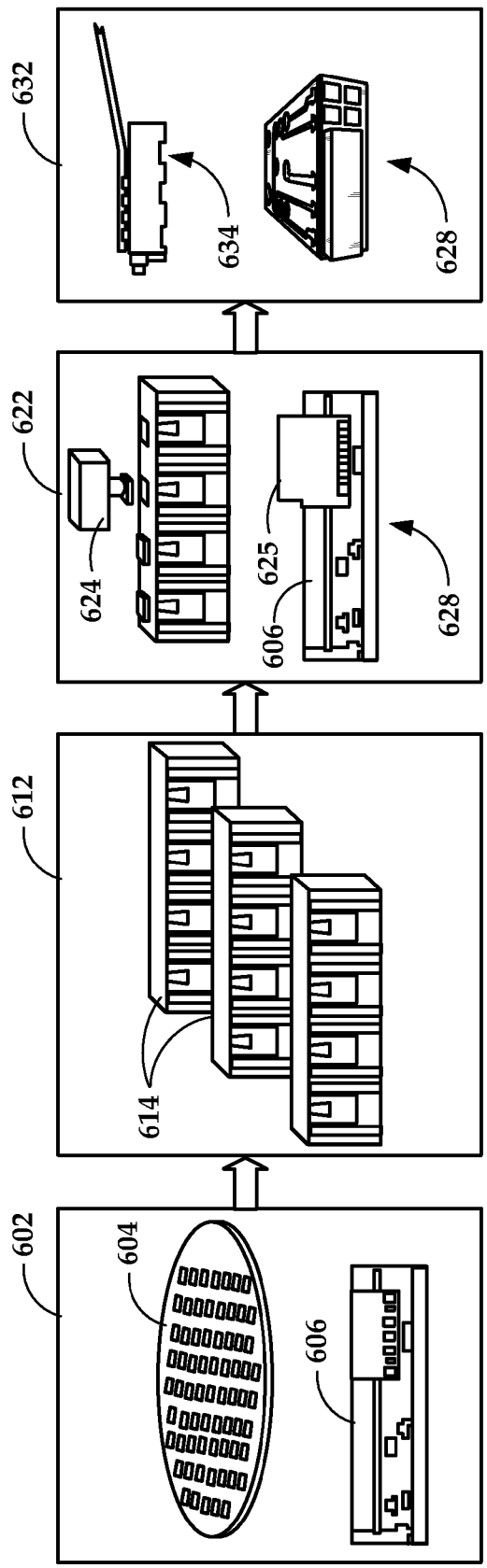
FIG. 6 is a high-level summary process flow diagram illustrating a bar-level laser attach with protruding edge-emitting laser diode according to an example embodiment.

In reference now to FIG. 6, a process flow diagram illustrates a high-level, short summary of a bar-level laser attach with protruding edge-emitting laser diode (EELD) according to an example embodiment. Block 602 represents a wafer-level stage. A wafer 604 is formed using semiconductor manufacturing processes (e.g., thin film deposition, chemical-mechanical polishing/planarization, etc.) and each wafer 604 generally includes a plurality of sliders (e.g., slider 606) that are later cut into bars for further processing. As previously discussed, the sliders 606 include a cavity for laser mounting via a solder array. A sacrificial protection material may be placed in the cavity to protect the solder array. The slider 606 is also includes various optical coupling and light positioning elements as previously discussed.

Block 612 represents an upstream stage where the wafer 604 has been cut into bars 614. Each bar 614 includes a plurality of sliders that are batch-processed. This stage 612 may involve attaching top bond pads (e.g., part of a slider-gimbal electrical interface) and performing electrical tests before attachment of lasers. Block 622 represents a bar-level laser attach stage. This stage 622 may involve removing sacrificial cavity fill material, and attaching the lasers. The lasers (e.g. laser diode 625) may be placed on the bars using a pick-and-place machine 624, and thereafter bonded to the slider (e.g., slider 606) via a reflow operation (e.g., application of heat to melt the solder bumps) to form assembly 628. This stage 622 may also involve encapsulating the laser 625 and laser-cavity interface, and performing post-attachment laser electrical/optical tests of the assembly 628.

Block 632 represents a stage for forming a modified dice and top bonding pad (TBP) head-gimbal assembly (HGA). Generally, this stage 632 may utilize standard TBP/HGA practices, except that tooling may need to be modified to account for the geometry of the integrated laser/slider assembly 628. Also, an optical test may be performed on the completed head-gimbal assembly 634 in addition to other tests performed on sliders in general (e.g., magnetic transfer curve response, electrical performance, etc.).

Figure 7:
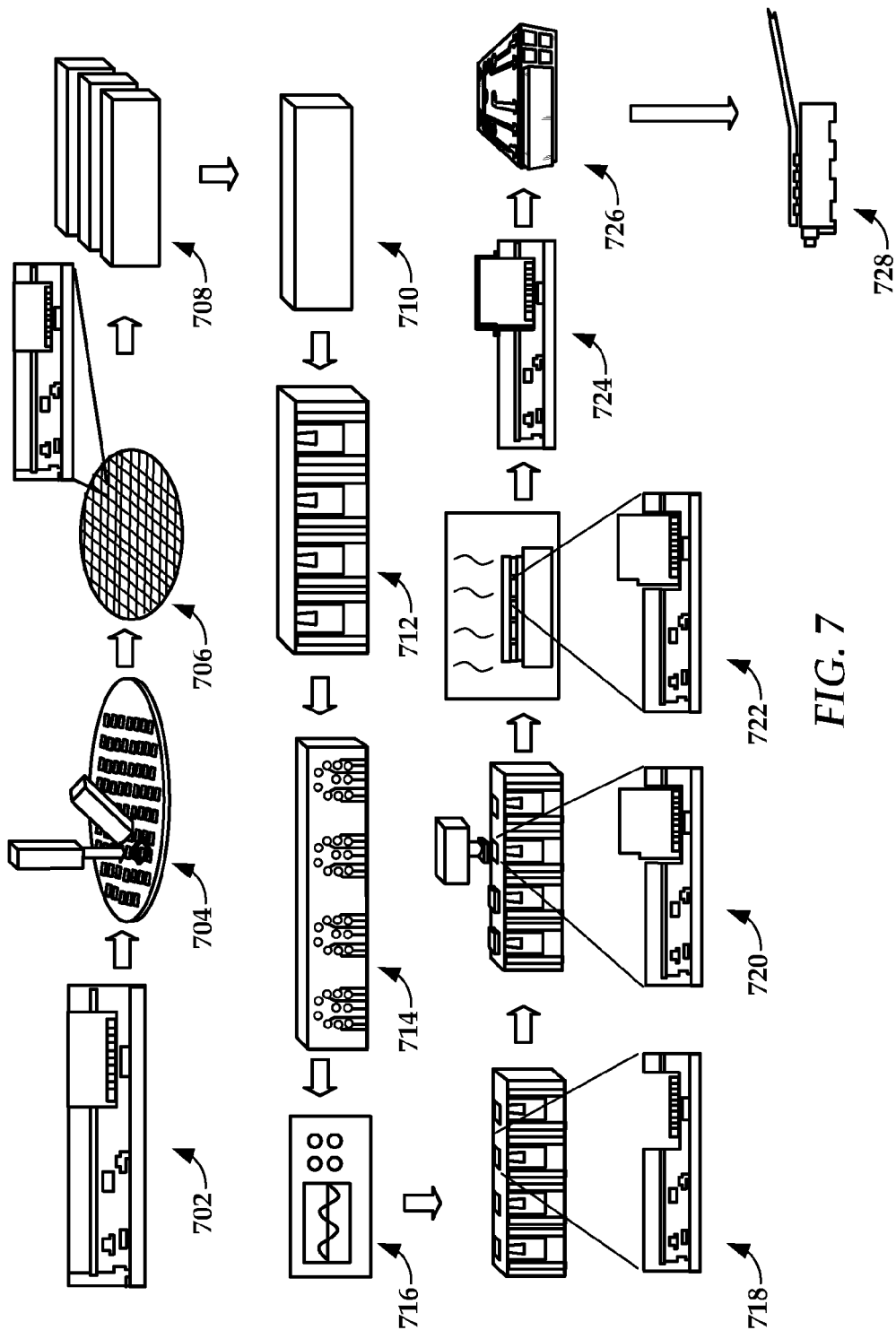
FIG. 7 is a more detailed process flow diagram illustrating bar-level laser attach with protruding edge-emitting laser diode according to an example embodiment.

In reference now to FIG. 7, a more detailed process flow diagram elaborates on some aspects of the high-level process flow described in FIG. 6. Step 702 represents wafer-level fabrication of read/write heads, optical elements, and laser solder array. Step 704 involves an optional wafer-level optical test, which may involve testing all slider components, or only a sample. At step 706, additional wafer-level processing may involve adding layer materials that do not require test, such as sacrificial fill of laser cavity to protect solder array.

At step 708, the wafer is sliced into bars, and the bars are ground and lapped at step 710. At step 712, a head overcoat and air bearing surface patterning is applied to the bars. At step 714, top bond pads and traces are applied, e.g., through layer deposition. After this step 714, the sliders in each bar are ready for electrical testing 716 of the read/write heads. After testing 716, the sacrificial cavity material can be etched/removed and the bar cleaned at step 718.

At step 720, a pick and place operation can be performed on each bar to "tack" the laser diodes into place. The laser diode is permanently bonded at step 722 via batch solder reflow. The reflow 722 may generally involve heating the bars in a vacuum oven and/or in an active environment that promotes solder flow. Next, a deposit/pattern is applied to encapsulate the laser-to-slider interfaces at step 724. At this point, the bars can be separated into individual sliders via remount/dice/dismount/clean operations at step 726. The laser-in-slider assembly can thereafter be assembled at step 728 to a head-gimbal assembly via top bonds of the slider.

In reference now to FIGS. 8A-12, example structural features are shown for various stages of a wafer forming process. The wafer may include a plurality of slider portions of laser-in-slider assemblies as described above. The wafer may be further processed after these forming steps, e.g., cut into chunks, bars, dies; attachment of laser diodes; HGA formation; etc.

Figure 8A:
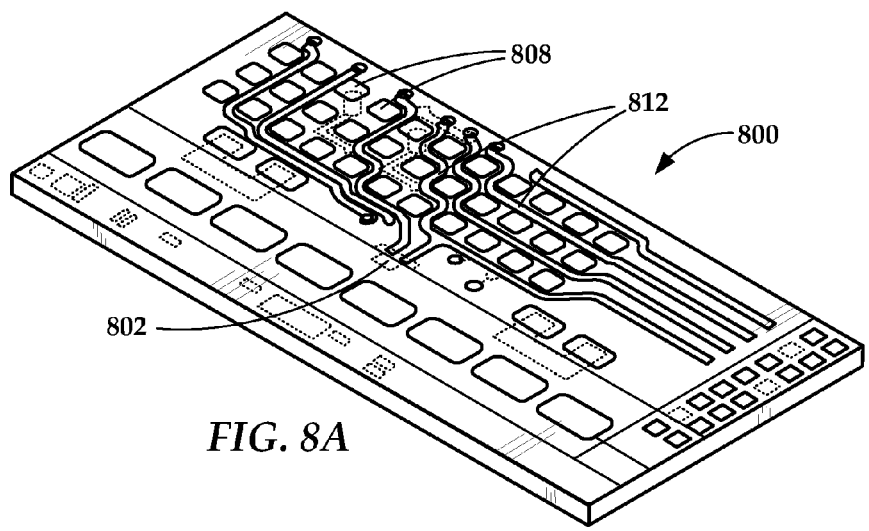
FIGS. 8A and 8B are perspective view of wafer assembly at early stages of slider manufacture according to an example embodiment.
Figure 8B:
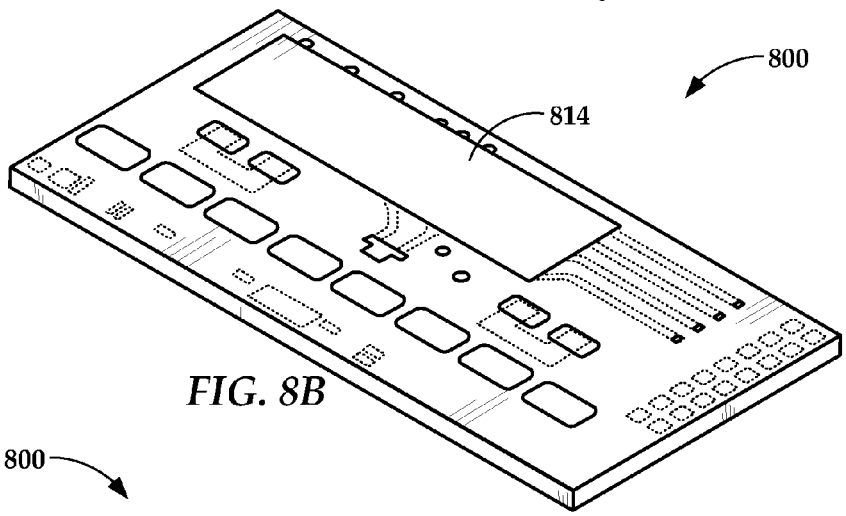
Figure 8C:
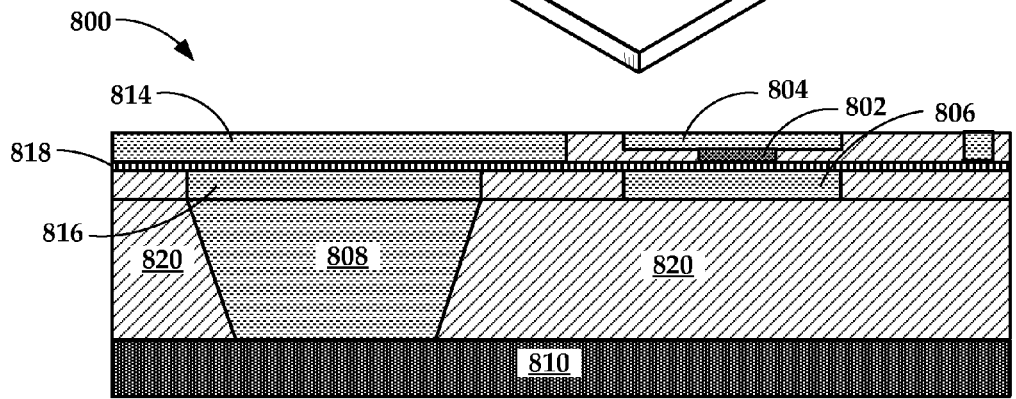
FIG. 8C is a cross sectional view of the wafer assembly of FIG. 8B.

During early build-up of the reader layers, heat sink features may be formed as shown in diagrams of FIGS. 8A-8C. In FIG. 8A, a perspective view shows an example wafer assembly 800 at an early stage of slider manufacture. At this stage, reader head 802 has been formed and is surrounded by top and bottom shields 804, 806 (see FIG. 8C). An array of plated thermal studs 808 facilitates heat transfer from the laser cavity to a substrate 810 (see FIG. 8C) formed, e.g., of AlTiC. The studs 808 may also provide for chemical-mechanical polishing/planarization (CMP) uniformity during subsequent processing steps.

The studs 808 are arranged in, e.g., a grid/array, thereby allowing easier routing of electrical pathways 812 for top bond pad studs. The electrical pathways 812 connect the top bond pad studs to reader, writer, and heater elements of the slider assembly 800. Top bond pad connections can be routed between the thermal studs using the contact steps or any other conductive layer. In other embodiments, the studs 808 may be formed as one large block, e.g., if alternate electrical paths are used.

As seen in FIG. 8B, an upper shield 814 used for a heat sink is overlaid above the electrical pathways. This shield 814 acts as a full metal heat sink pad and is thermally coupled to the studs 808. Forming the shield 814 as a heat sink can reduce a number of additional process steps that would otherwise be needed to form a separate heat sink. As seen in FIG. 8C, a bottom shield 816 and contact layer 818 may also lie between the upper shield 814 and studs 808. Also seen in FIG. 8C is a base coat 820 that fills the spaces between the studs 808. A similar base coat may be used in layers where the bottom shields 806, 814 and top shields 804, 814 reside.

Figure 9A:
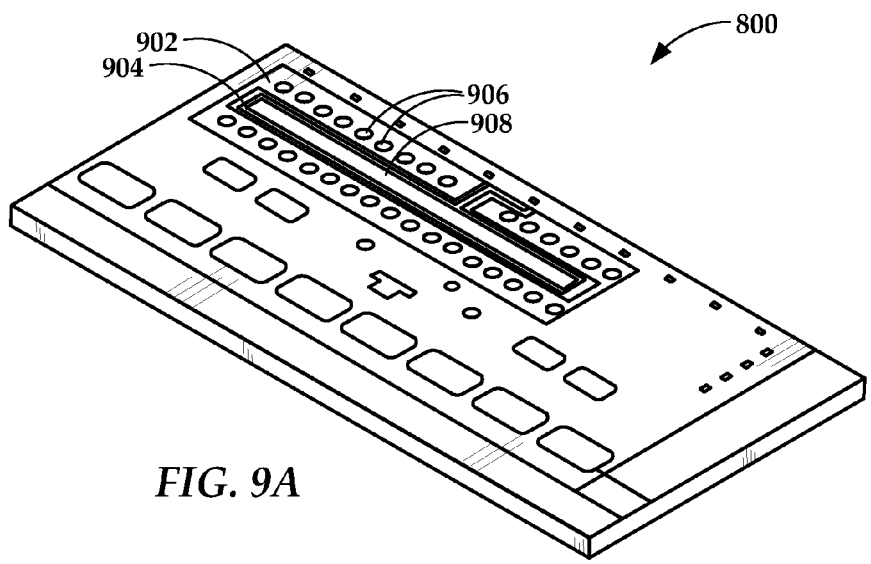
FIG. 9A is perspective view of wafer assembly after further stages of slider manufacture according to an example embodiment.
Figure 9B:
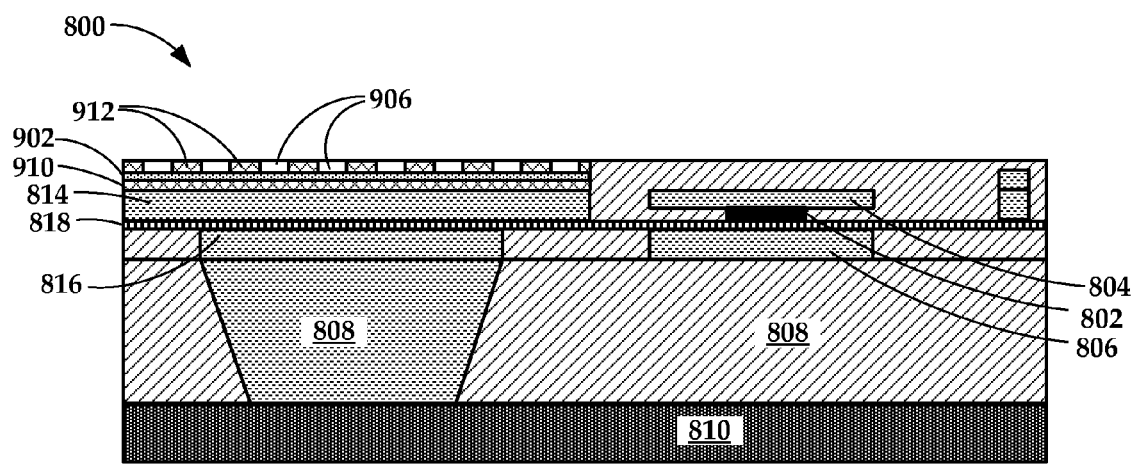
FIG. 9B is a cross sectional view of the wafer assembly of FIG. 9A.

In reference now to FIGS. 9A and 9B, perspective and cross-sectional views of example wafer assembly 800 show additional details related to formation of laser electrode and cavity bottom of the slider at another manufacturing stage. At this stage, N and P (stripe) laser electrode material are respectively layered on areas 902, 904. Also formed at this stage are circular and stripe laser electrode vias 906, 908. The vias are openings allowing solder material to bond to the laser electrodes 902, 904. The vias 906, 908 may be the desired size of the self-alignment wettable pads (e.g., pads 204, 206 in FIGS. 2A and 2B) and be subsequently deposited with materials to form under bump metallurgy (UBM).

In some embodiments, the vias 906, 908 may be smaller than the UBM. Also seen in FIG. 9B are isolation/insulation layers 910, 912 below and above the electrode layer 902 shown in this cross section. The patterning of the insulating layer 912 with the laser electrode vias 906 helps to prevent wetting of the subsequently formed solder bumps to the entire laser electrode layer 902. The lower insulation layer 910 may reside between the laser heat sink 814 and the laser electrical contact layer, and may include minimal thermal impedance to improve thermal conduction therebetween.

Figure 10A:
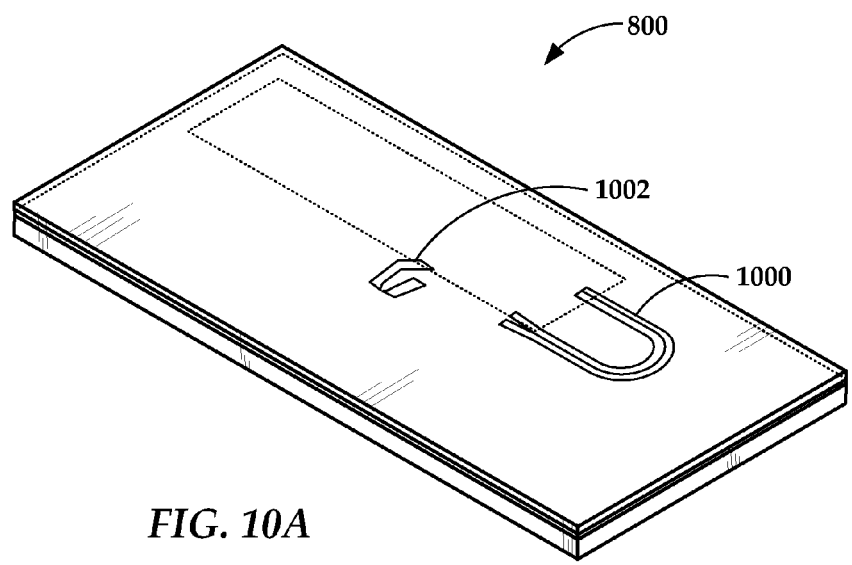
FIG. 10A is perspective view of wafer assembly after further stages of slider manufacture according to an example embodiment.
Figure 10B:
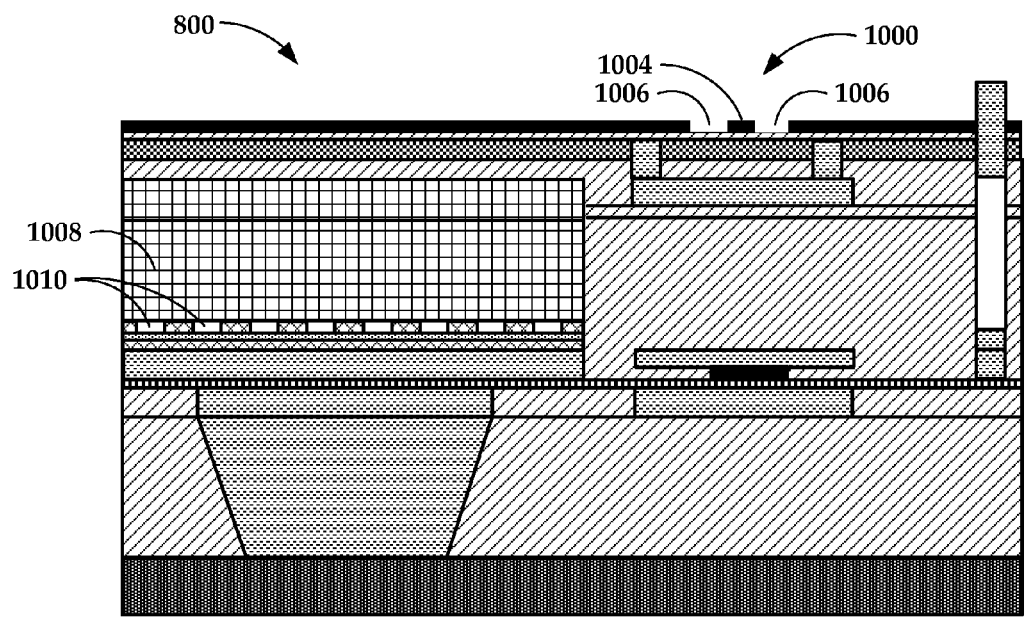
FIG. 10B is a cross sectional view of the wafer assembly of FIG. 10A.

Shown in FIGS. 10A and 10B are perspective and cross-sectional views that represent the subsequent formation of optical waveguide 1000 and SIM 1002 on top of the wafer assembly 800. As seen in FIG. 10B, the waveguide 1000 may include a core 1004 made, e.g., from $Ta_2O_5$. The core 1004 is formed by masking the desired waveguide core shape and etching a portion 1006 of material surrounding the core. The etched portions 1006 may be filled with a cladding material (e.g., alumina) having a different index of refraction than the core. The SIM 1002 may be formed by depositing and etching a reflective material to the desired shape. In these stages, the cavity has been defined by depositing a sacrificial fill material 1008 on top of the insulating layer 912 and UBM electrodes 1010.

Figure 11A:
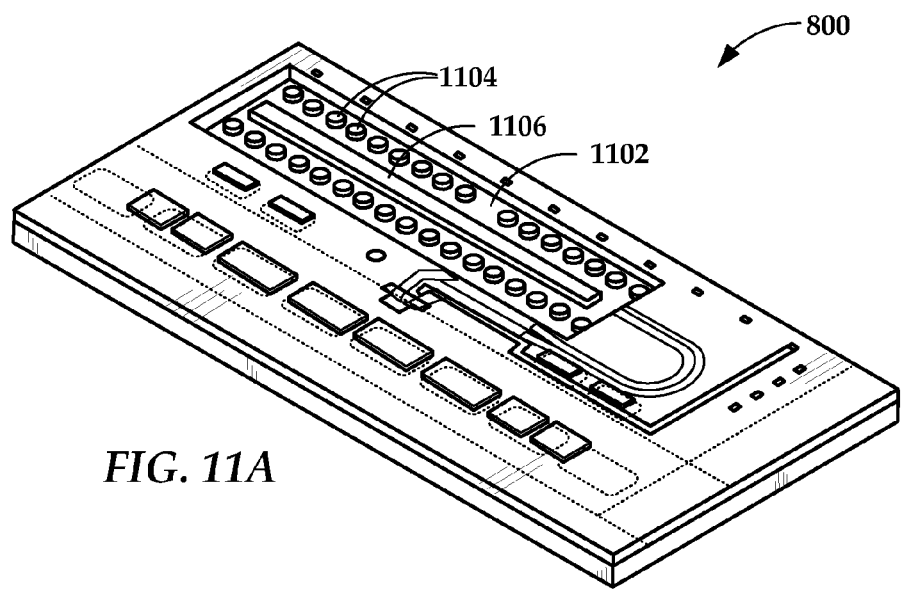
FIG. 11A is perspective view of wafer assembly after further stages of slider manufacture according to an example embodiment.
Figure 11B:
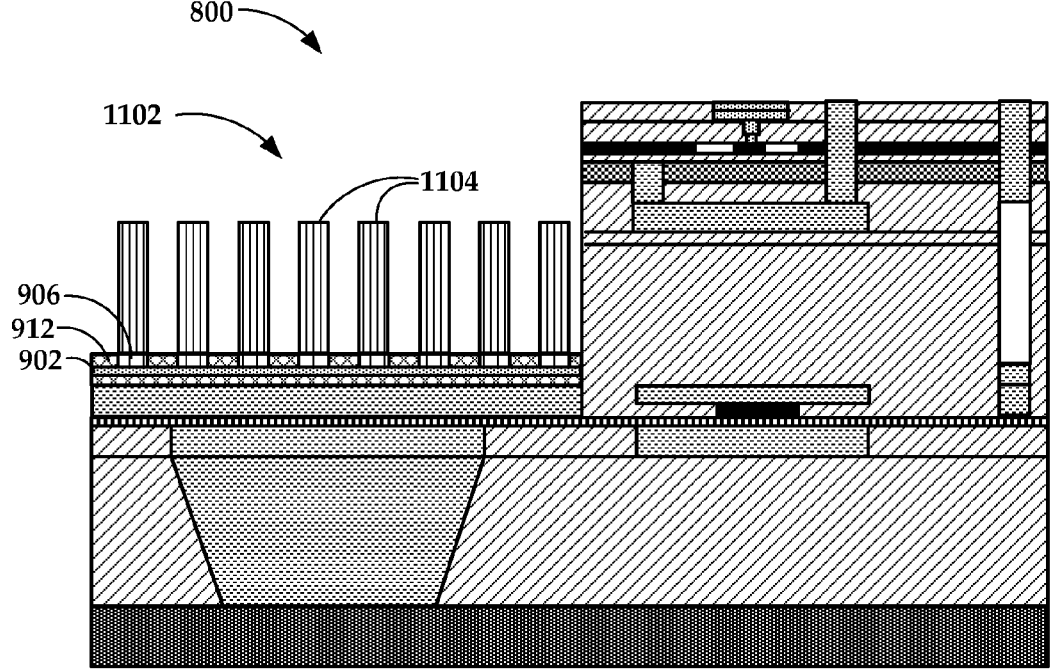
FIG. 11B is a cross sectional view of the wafer assembly of FIG. 11A.

In reference now to FIGS. 11A and 11B, perspective and cross sectional views of example wafer assembly 800 show additional details related to formation the solder bump array at another manufacturing stage. A previous dry etch step (not shown) removes the sacrificial layer 1008 and produces the cavity 1102. Thereafter, solder bumps 1104 and strip 1106 may be formed over the vias 906 using electroplating or evaporation/liftoff. It should be noted that the aspect ratio of the bumps 1104 shown in FIG. 11B is not intended to be shown to scale. The solder bumps 1104 may be formed with an aspect ratio (height to diameter) closer to 1:1.

In one embodiment, an appropriate "under bump metallurgy" (UBM) material can be used for the laser electrode layer 902. Under bump metallurgy utilizes a material (e.g. nickel and other metals) that forms a good wettable metal layer for the solder and prevents diffusion into the solder bump from underlying metal layers or out of the solder bump into underlying metal layers. The patterning of the insulating layer vias 906 can be used to define the wettable pad, which may be used for solder self-alignment resolution. The insulating layer 912 may also prevent exposure of the underlying metallurgy pad to a subsequent wet-etch process, protecting it since the side of a layer stack would not be exposed to a cavity wet etch. Another embodiment has the UBM materials deposited on top of the laser electrode vias 906 at the same time (or just prior) to the deposition of the solder material 1104.

Figure 12:
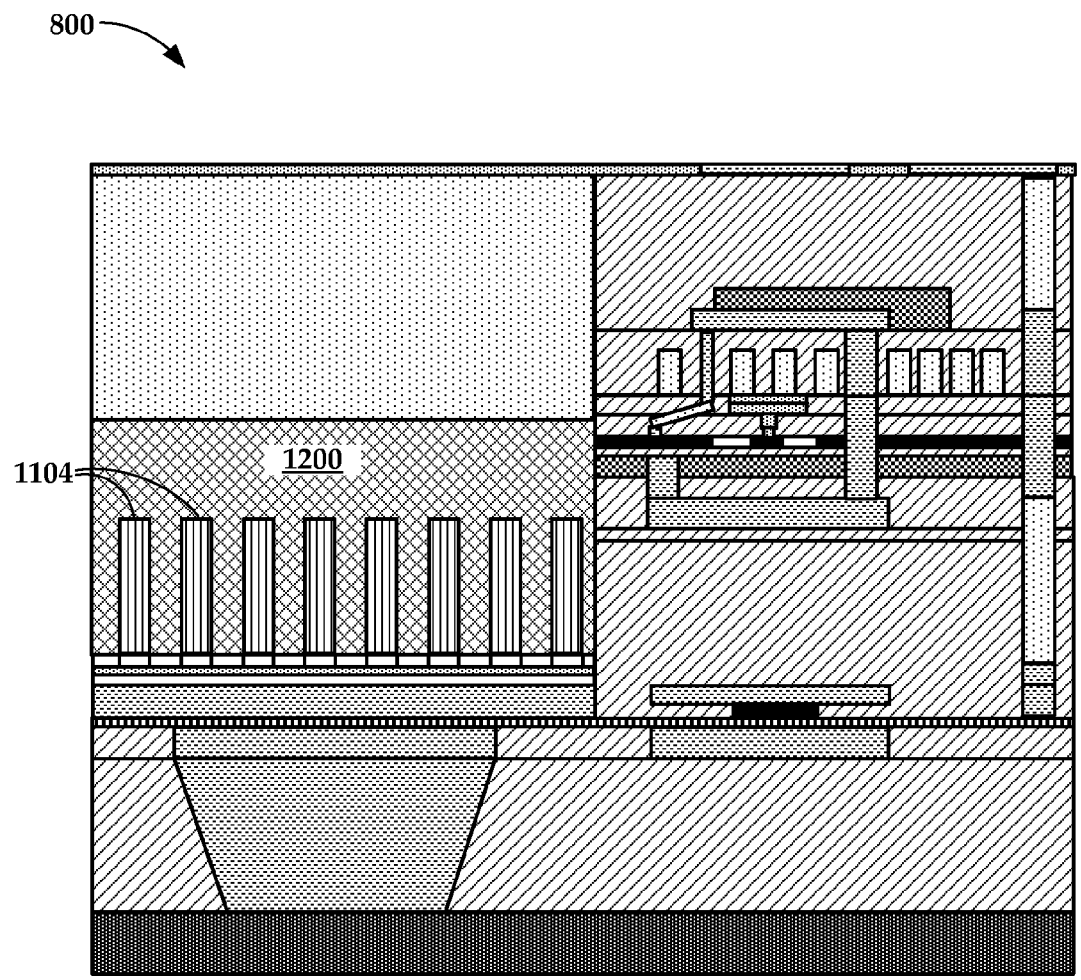
FIG. 12 is a cross sectional view of the wafer assembly of FIG. 11A at the end of the wafer formation process according to an example embodiment.

In reference now to FIG. 12, a cross sectional view shows an example structure of slider wafer 800 at the end of the wafer formation processes. At this stage, the wafer 800 is ready for slider processing, which may include subsequent processes of bar formation, laser attach, and laser encapsulation. The solder bumps 1104 are surrounded by sacrificial fill material 1200 for solder protection. The sacrificial material 1200 to protect the solder bumps and stoppers during the slider bar processing. The sacrificial material may include a metal (e.g., copper) to create the cavity dimension by depositing material in the desired location. In one embodiment, the deposited material may then be overcoated with surrounding cavity material (e.g. alumina) using a damascene type process. The formation of this part of the cavity may be less critical than the precisely etched features that go through the optical layers in subsequent process steps.

As previously discussed, it may be important to precisely align the output facet of the laser with the optics integrated into the slider (e.g., the core of a slider-integrated coupler/waveguide). This alignment may be affected by, among other things, the side-to-side placement of the laser within the cavity and the height of the laser after solder reflow. In the discussion that follows, various features and processes are described that facilitate precisely defining cavity to waveguide core spacing. Defining this spacing facilitates controlling the distance between the top of stoppers or bottom of the cavity and the core layer.

Figure 13:
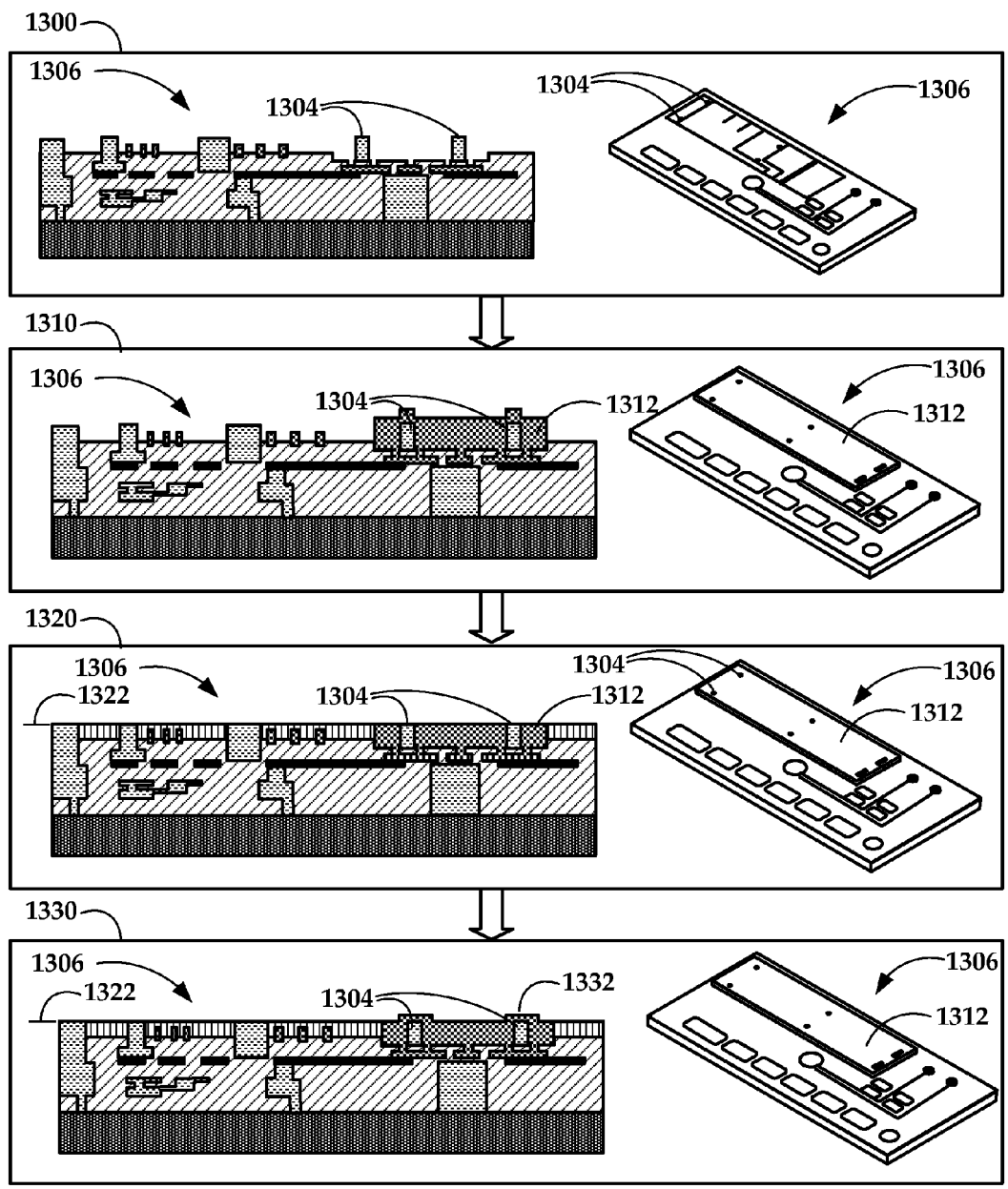
FIG. 13 is a process flow diagram illustrating the establishment of a reference layer in a slider according to an example embodiment.

In reference now to FIG. 13, a process flow diagram illustrates the establishment of a reference layer according to an example embodiment, wherein vertical stoppers are used in a laser mounting cavity. At step 1300, vertical laser stoppers 1304 are formed by, e.g., electroplating, onto wafer 1306. These stoppers 1304 become mechanical references for laser position during reflow. At step 1310, the cavity is defined by a sacrificial fill 1312 of, e.g., copper.

At step 1320, a reference surface 1322 is defined by a CMP process. For example, a relatively thick layer of alumina may be deposited on the top surface, and the surface is subjected to CMP so that the stoppers 1304 are exposed and the surface 1322 is at the desired dimension. The surface 1322 becomes the reference layer from which the spacing between the stopper 1304 and coupler/core layer when the latter are subsequently deposited. This ultimately facilitates precise alignment of the laser output facet with the coupler/core layer. At step 1330, a stopper protection layer 1332 is deposited. This may involve depositing the layer 1332 as an etch stop and then pattern using a method such as lift off.

Figure 14A:
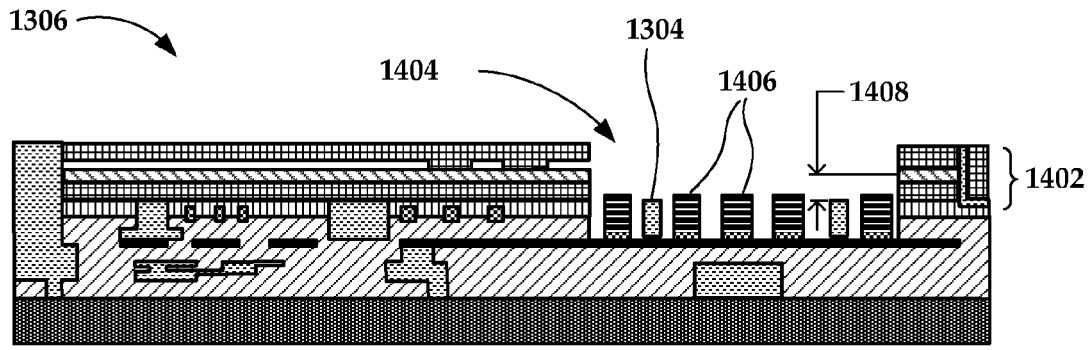
FIG. 14A-14C are cross sectional diagrams illustrating pre- and post-laser bonding configurations according to an example embodiment.

In FIG. 14A, a cross sectional diagram shows the wafer 1306 after a number of other processing steps (not shown) have been performed. Those steps include the formation of optical layers 1402, removal of sacrificial material to form the cavity 1404, and deposition of solder bumps 1406. Final portion of the cavity 1404 is formed during the stud forming process (not shown). The cavity 1404 can be slightly larger than the cavity below to ensure that critical alignment features (e.g., lateral mechanical stopper features) are defined by the precise cavity etch of the optical layers 1402, and not the final stud plating step (not shown).

In order to maintain good optical properties where the layers 1402 meet the cavity 1404, fill material (e.g., material 1312 in FIG. 13) may be something that is easily removed by a wet-etch (such as copper) or a dry process such as (a-C) that will not affect the edges of the waveguide. The optical materials of the layers 1402 should also be chosen for good profile control and optical qualities. For example, SiONx may be used as a core material in some embodiments because this material etches fairly comparably to a surrounding alumina cladding, alumina being a material commonly used for this purpose.

The previously illustrated CMP planarization (e.g., step 1320 shown in FIG. 13) of the vertical stoppers 1304 has defined a reference datum point 1408 between the top of the stoppers and alumina in the field. The result is that the spacing from the top of the stoppers to the coupler/core optical layers may be solely defined by deposition thickness control. This facilitates precise alignment of laser to the slider during post-wafer manufacturing processes. An example of alignment of an edge-emitting laser diode 1420 in the cavity 1404 is shown in cross sectional views of FIGS. 14B and 14C.

Figure 14B:
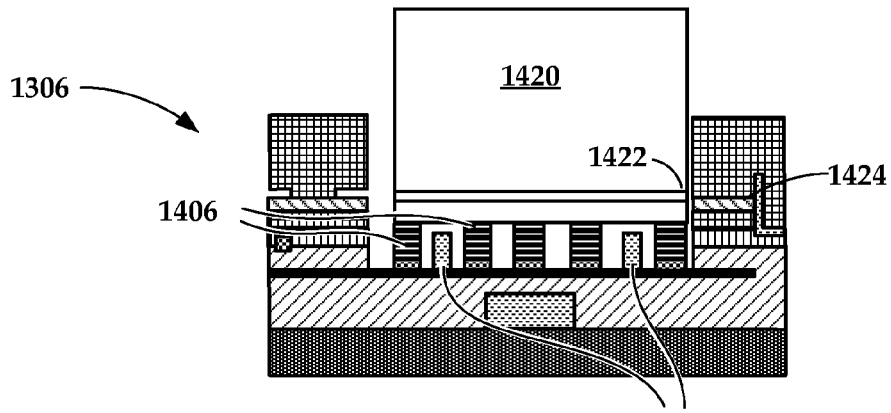
Figure 14C:
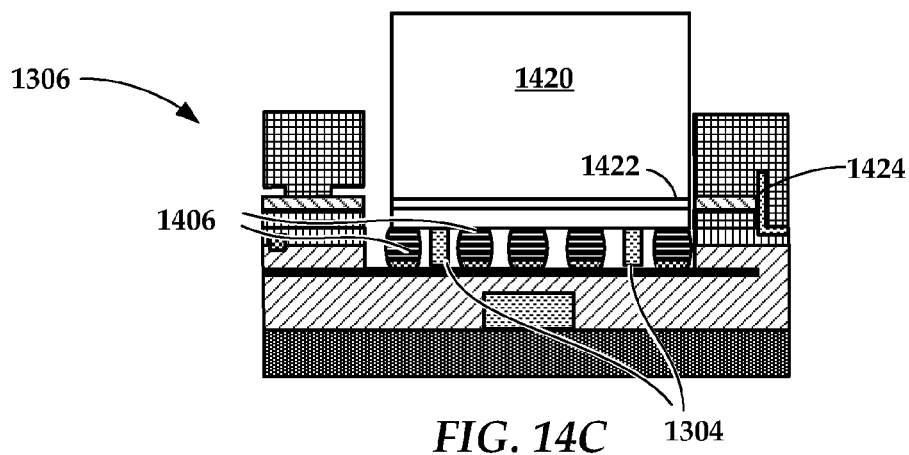

In FIG. 14B, the laser diode 1420 has been tacked into position following, e.g., a pick and place operation on a wafer, chunk, and/or bar assembly. At this stage, there may be a gap between the laser 1420 and the vertical stoppers 1304 due to the solder bumps 1406 being higher than the stops 1304. At this point, an output facet 1422 of the laser 1420 may be misaligned with core 1424. In FIG. 14C, the configuration after a reflow operation has been performed. At this stage, the solder bumps 1406 have been reshaped due to the reflow, and the laser 1420 contacts the stops 1304. This results in proper vertical alignment between the output facet 1422 and core 1424.

Figure 15:
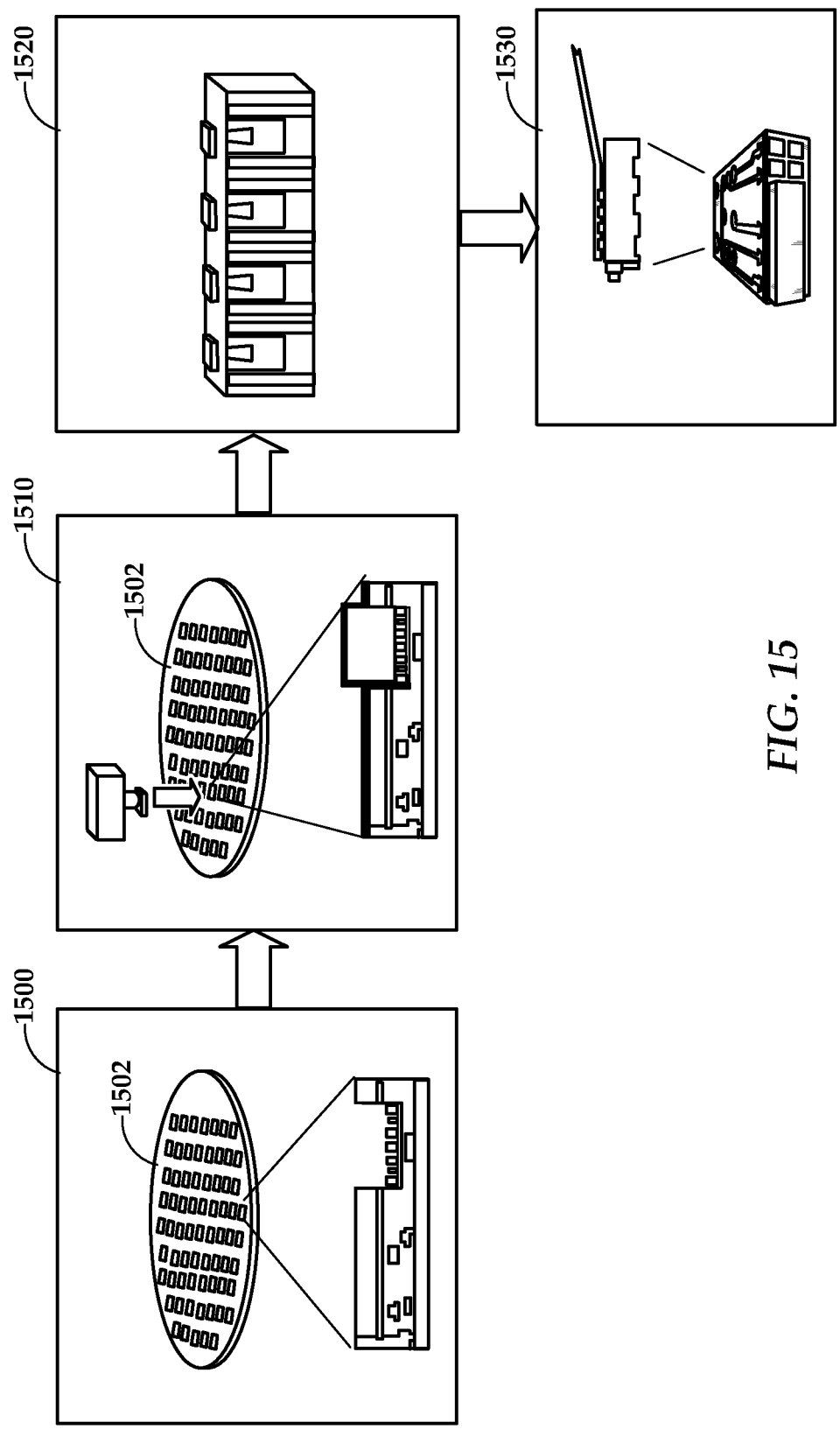
FIG. 15 is a process flow diagram illustrating laser attach of a protruding edge-emitting laser according to an example embodiment.

In reference now to FIG. 15, a process diagram illustrates laser attach of a protruding edge-emitting laser according to another embodiment. This process is similar to previously described processes, except that particular steps are performed as a wafer-level or chunk-level. The term "chunk" generally refers to a portion of the wafer that is larger than a bar, but less than the whole wafer. At step 1500, a wafer/chunk 1502 is manufactured as generally described above. This step may include, for example, depositing read/write heads, shielding, heat sink, electrical pathways, optical components, laser cavity, and solder bumps.

Figure 16:
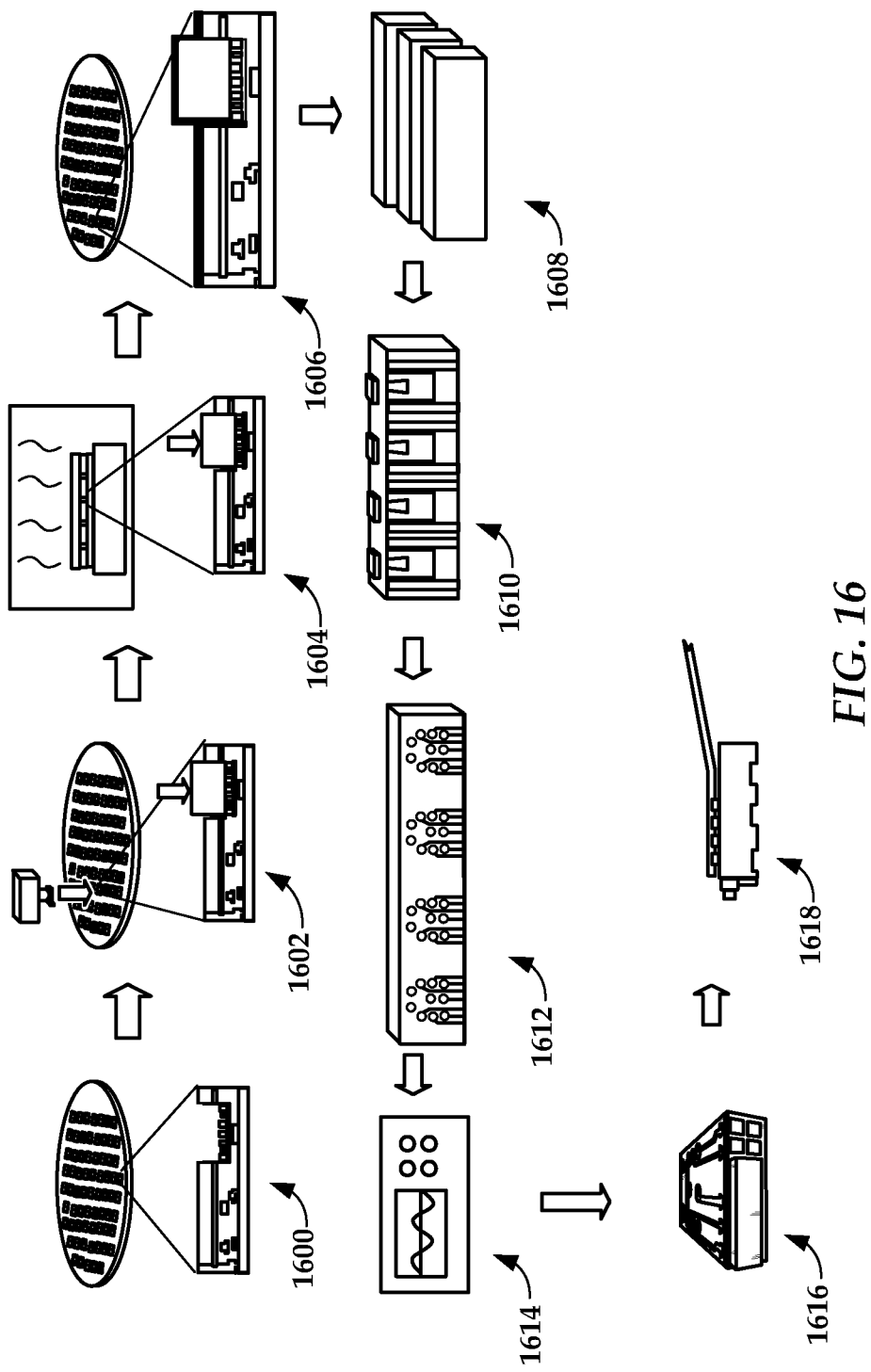
FIG. 16 is a more detailed process flow diagram illustrating laser attach of a protruding edge-emitting laser according to an example embodiment.

Unlike other processes described above, the illustrated process may include a step 1510 where the laser diode is assembled and encapsulated at wafer-level or chunk-level prior to bar-level processing and slider formation. This may result in a more-efficient assembly and encapsulation process compared to the bar-level processing. However, because the laser is protruding from the laser cavity at the beginning of the slider process, much of the upstream slider processes 1520, 1530 may need to be modified to allow physical mounting and access to the trailing edge as well as to prevent damage to the laser. More details of this process flow are shown in FIG. 16.

Generally, this process involves processing 1600 that may include wafer-level fabrication of read/write head, optical elements, laser solder attach, and backend overcoat. The next step 1602 involves wafer-level (or chunk-level) pick and place to "tack" the laser diode into place. Batch solder reflow (again at the wafer/chunk level) is performed 1604 in a vacuum and/or active environment. This batch reflow 1604 may self-align the laser diodes in the sliders based on surface tension of the melted solder arrays. Features such as the above described vertical stops may ensure the lasers remain aligned during reflow 1604.

Encapsulation material is deposited/patterned at step 1606. Encapsulation 1606 of the laser diode at wafer level may help ensure that particle and chemical contamination is prevented from coming into contact with laser-slider coupling regions. At this point, the wafer is ready for bar slice and lap at 1608. The remaining steps may be performed as previously described above, include depositing of head overcoat and air bearing patterning (1610), top bond patterning/deposition (1612), electrical testing of read/write head and optical testing of laser and optics (1614), remount-dice-dismount-clean (1616) and top bond pad head gimbal assembly (1618)

Figure 17:
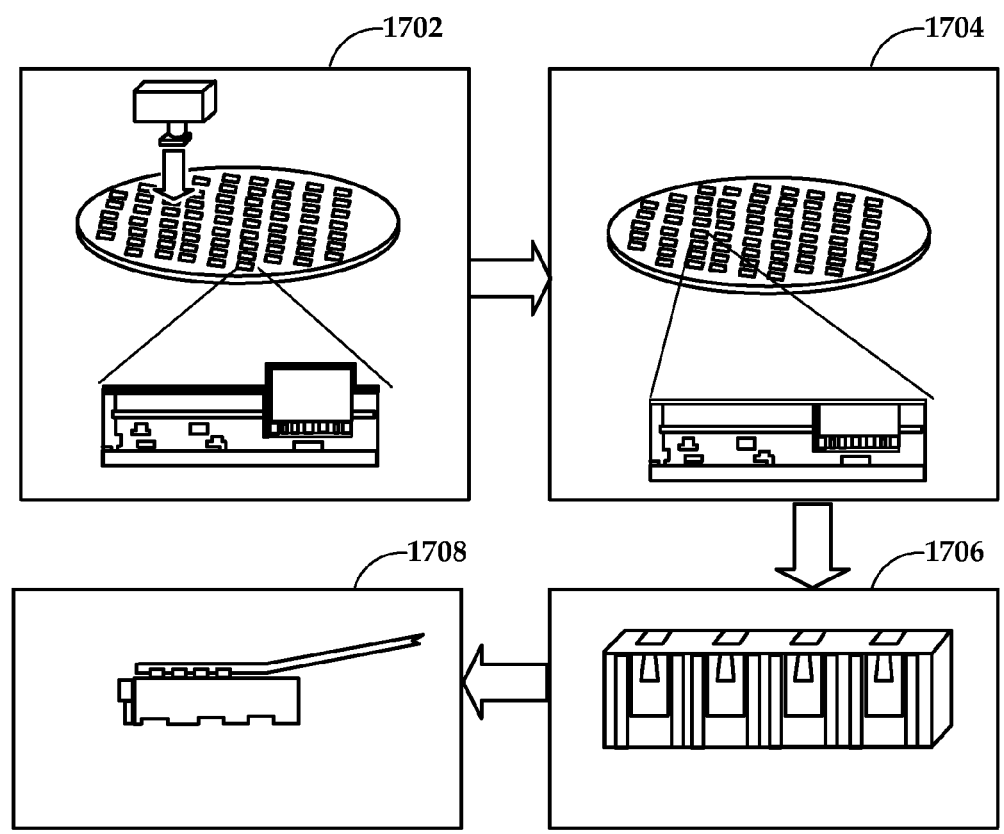
FIG. 17 is a high-level process flow diagram illustrating a process for forming laser-in slider devices according to another embodiment.

In reference now to FIG. 17, a high-level process diagram illustrates a process for forming laser-in slider devices according to another embodiment. In this process, laser attach may occur at the wafer/chunk level, and may include a planarized and embedded laser diode. This method is similar to the processes described in FIGS. 15-16 above, except that after laser attach and encapsulation, the laser is mechanically ground down to eliminate the protrusion from the laser cavity and/or the surrounding area is built up with thick material to planarize to the level of the protruding laser.

At stage 1702, a wafer-level fabrication of sliders may include building up of read/write heads, shielding, heat sink, electrical pathways, optical components, laser cavity, and solder bumps. In addition, stage 1702 may also involve wafer or chunk-level pick and place of the laser, batch reflow to bond and align the laser, and encapsulation of the laser/slider. At stage 1704, the protruding laser material is planarized level with the top edge of the slider. Surface insulation and back end pads may also be deposited at this stage 1704. Similar to other described processes, this process may involve, at stage 1706, performing bar-level processing (including addition of top bond pads) and bar-level laser/optical and electrical testing. Stage 1708 may involve top bond pad to head gimbal assembly and HGA optical testing.

This approach seen in FIG. 17 combines the benefits of wafer-level or chunk-level laser attach with additional benefits of minimal effects on the slider process due to the protrusion of the laser diode from the cavity. By eliminating the protrusion of the laser on the trailing edge of the slider/bar, very few modifications may be needed in the upstream read/write head slider fabrication process. In addition, with the laser embedded, the entire trailing edge surface is available for standard bond and probe pads that are used during fabrication of the bar, e.g., electrical connection to "electrical lapping guides" (ELGs) for lapping control.

Figure 18:
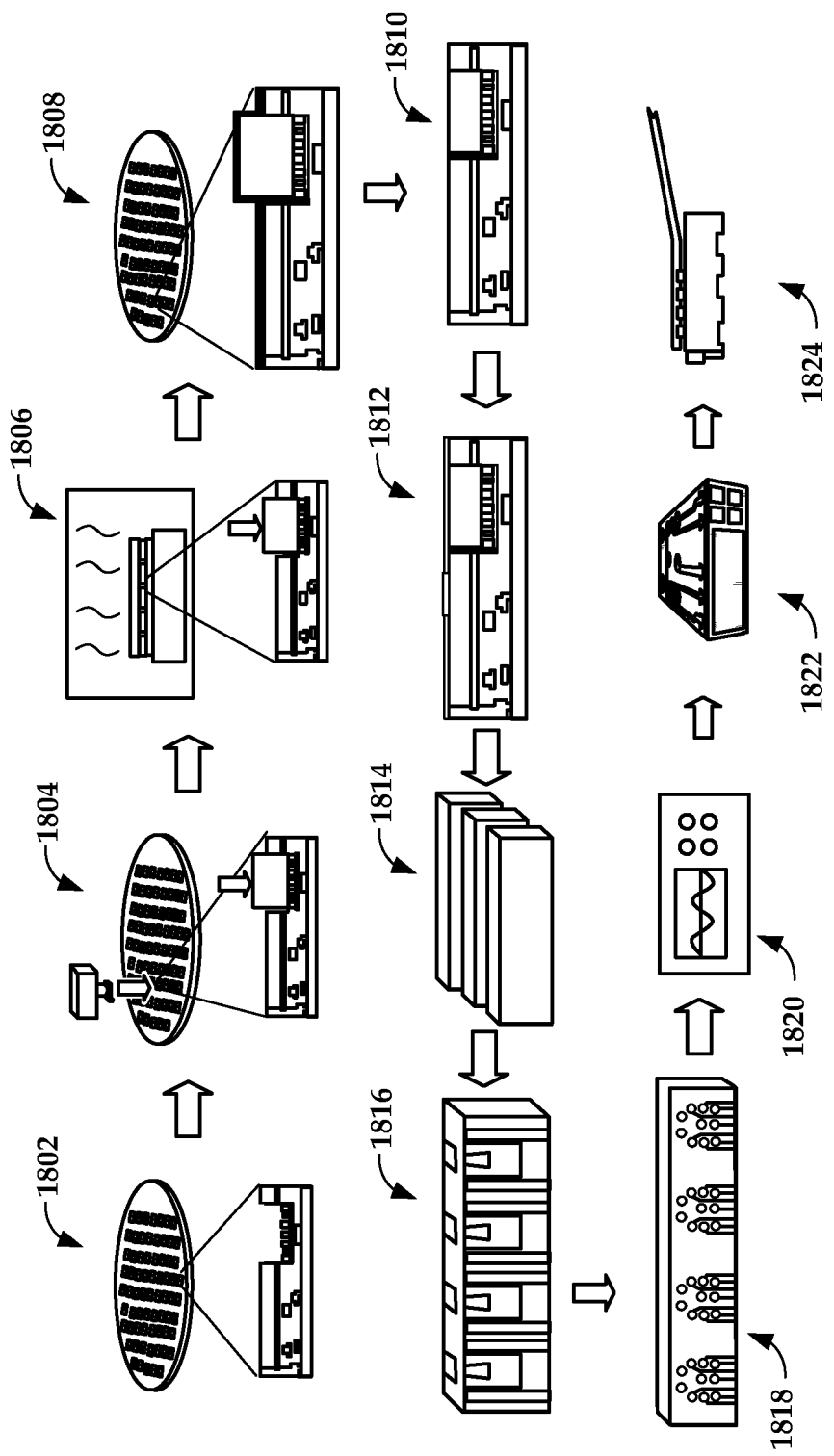
FIG. 18 is a process flow diagram showing more details of the process flow shown in FIG. 17 according to an example embodiment.

In reference now to FIG. 18, a process diagram shows more details of the process flow outlined in FIG. 17. Step 1802 may involve wafer-level fabrication of the slider, e.g., read/write head, optical elements, laser solder attach, and backend overcoat. Step 1804 includes wafer-level (or chunk-level) pick-and-place tacking of the laser into the cavity. Step 1806 includes batch solder reflow in a vacuum/active environment. Step 1808 includes depositing/patterning of encapsulation material. Step 1810 includes planarizing of the wafer to remove protruding laser material. Step 1810 may alternately or additionally include adding material surrounding the laser to planarize to the top surface of the protruding laser. Step 1812 represents the last stage of wafer-level (or chunk-level) processing, which may include adding coating and bond pads.

At step 1814, a bar slice and lap operation separates the wafer/chunk into individual bars. At step 1816, deposition of head overcoat and air bearing patterning occurs. At step 1818, top bond pads are patterned/deposited. Electrical testing of read/write heads and optical testing of laser and optics occurs at step 1820. At step 1822, the bars are separated into individual sliders, which may include remount, dice, dismount, and clean of the assembly. At step 1824, the top bond pad to head gimbal assembly Occurs.

Features of note in the processes illustrated in FIGS. 17 and 18 include the removal of "extra" laser material after attachment by planarizing portions of the laser extending outside the pocket. Afterwards, embedding/protective layers may be subsequently formed over the planarized laser. As mentioned above, the wafer could actually be a "chunk," e.g., a smaller portion of the larger wafer for a "chunk-level laser attach"

In the previous embodiment, an edge firing laser diode was mounted in a slider cavity. Some aspects of the processes described above may also be applicable to other types of laser and slider configurations. The description below relates to methods for fabrication of a non-edge firing light source into integrated optics of a HAMR read/write head. In reference now to FIG. 19A, a perspective view shows a non-edge firing laser 1902 mounted to a slider assembly 1900 according to an example embodiment. In this illustration, the laser 1902 is a vertical cavity surface emitting laser (VCSEL) integrated into the trailing edge of a read/write head 1904. The illustrated configuration may be applicable to other types of lasers, such as grating-coupled surface emitting laser (GCSEL) and/or horizontal cavity surface emitting laser (HCSEL).

Figure 19A:
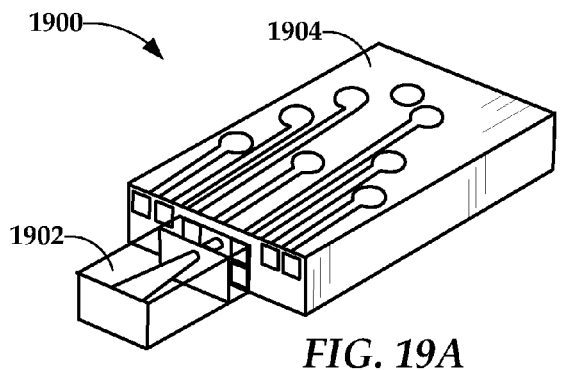
FIG. 19A is a perspective view of a non-edge firing laser mounted to a slider assembly according to an example embodiment.

As may be evident from FIG. 19A, the physical envelope of assembly 1900 is different than the sliders shown in previous descriptions. In this configuration, there is no laser cavity and therefore no sacrificial layers used in the slider fabrication process. The VCSEL laser 1902 may be mounted at a desired tilt-angle to get optimal coupling. Solder and/or mechanical structures may be used to establish the desired alignment between the laser and the coupler.

Figure 19B:
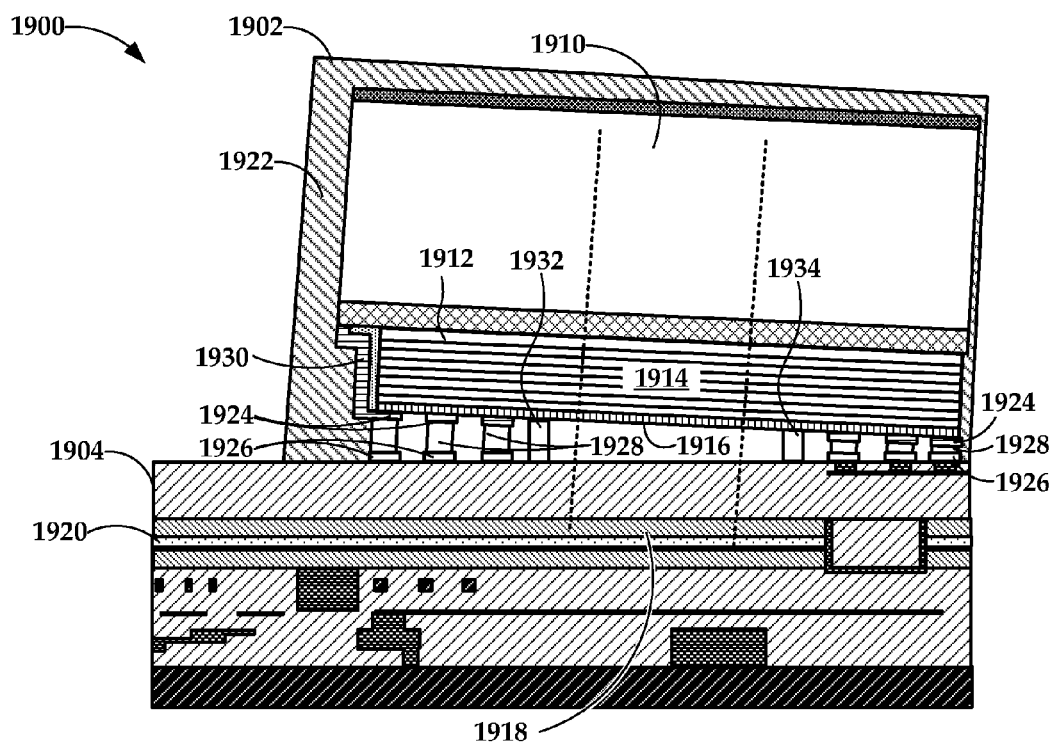
FIG. 19B is a cross sectional view of the laser diode and read/write head of FIG. 19A.

In FIG. 19B, a cross sectional view shows the VCSEL diode 1902 mounted to read/write head 1904. The VCSEL 1902 includes an active region 1910 having one or more quantum wells for the laser light generation. An extended/external cavity 1912 is located above the active region 1910. Light exits from an output aperture 1914 and output facet 1916 to a coupling grating 1918 where light is launched into the delivery optics 1920 (e.g., waveguide) for ultimate delivery to HAMR media. The VCSEL 1902 may include an encapsulation layer 1922 similar to that described above for the edge-firing laser.

The assembly 1900 in FIG. 19B also includes self-alignment features that help ensure efficient coupling between the VCSEL 1902 and the read/write head 1904. Those features include precisely patterned solder bonding pads 1924, 1926 on the VCSEL 1902 and head 1904, respectively, that provide precise positioning control for the laser output aperture 1914 relative to the grating 1918. The VCSEL pads 1924 may connect to both the n-region (e.g., via path 1930) and to the active region 1912.

Solder bumps 1928 bond the pads 1924, 1926 together to mechanically and electrically couple the VCSEL 1902 to the read/write head 1904. The solder bumps 1928 may also be configured to provide a seal around the bottom of the VCSEL 1902. Mechanical stops 1932, 1934 provide a tilt-mounting reference so that the VCSEL 1902 is correctly oriented with the solder bumps 1928 are reflowed.

Figure 20A:
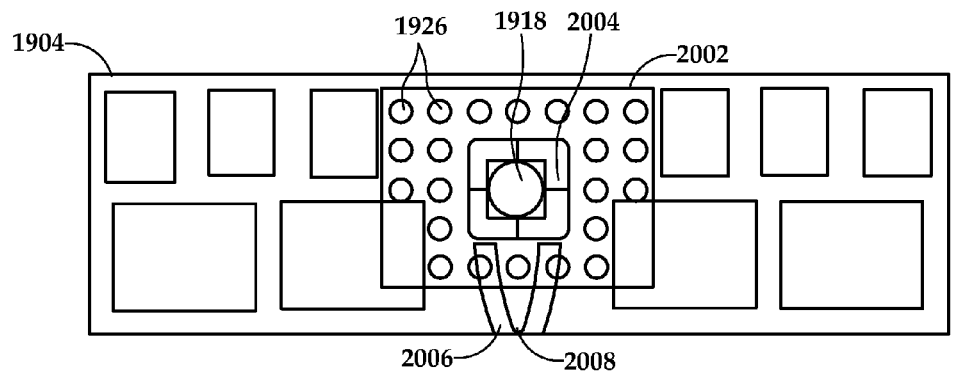
FIG. 20A is a trailing edge view of a read/write head according to an example embodiment.

In reference now to FIG. 20A, a trailing-edge view of the read/write head 1904 show various features according to an example embodiment. Region 2002 represents outline of the laser (e.g., VCSEL 1902 shown in FIGS. 19A-19B) that mounts to bonding pads 1926 (e.g., via solder bumps) and launches light into near-normal incidence angle optical grating coupler 1918. Seen in this view is a sealing ring 2004 that may help contain laser emissions, and may provide other functions (e.g., heat sinking, electrical connectivity, etc.). Laser light launched into the grating coupler 1918 is guided through an optical core layer to a focusing solid immersion mirror (SIM) 2006 and near-field transducer (NFT) 2008 that provide the localized heat source for HAMR recording.

Figure 20B:
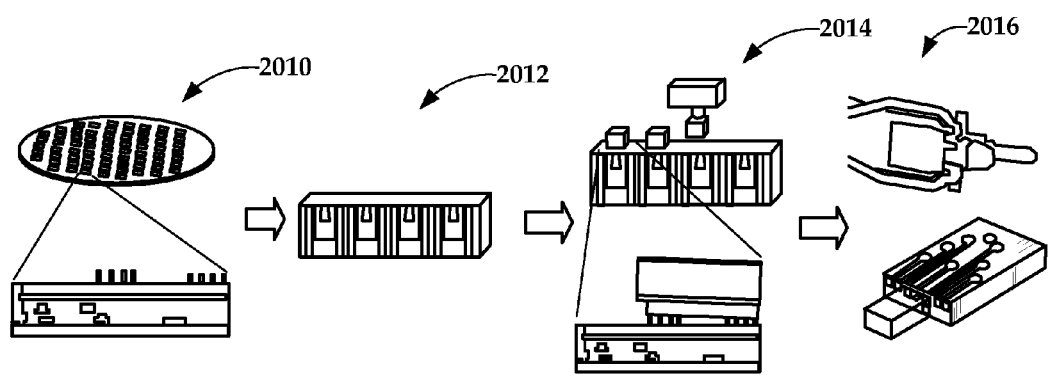
FIG. 20B is a sequence diagram of a high-level process flow including bar-level vertical cavity surface emitting laser attach according to an example embodiment.

In FIG. 20B, a process diagram provides a high-level view of a VCSEL process flow with a bar-level laser attach according to an example embodiment. This process utilizes a bar-level attachment of a VCSEL into a trailing edge grating coupler. Steps of FIG. 20B are divided into wafer processing 2010, slider processing 2012, laser attach 2014, and HGA process 2016. The wafer-level processing 2010 may include forming trailing edge coupling grating, tilt-mount bumps for angled light input, trailing edge bond and probe pads, and wafer-level optical test. The upstream slider processing 2012 may include bar-level HAMR with grating slider processing (including top bond pads), and pre-laser optical and ISI test. The bar-level laser attach 2014 includes bar-level pick and place to tilt-position the VCSEL, batch reflow, optional encapsulation, and post-laser optical testing. The modified dice and top bond pad head gimbal assembly 2016 may include standard die-separation, cleaning, and other post-laser-attach steps previously described, although may require modified tooling in comparison to those processes. The process 2016 may also include an HGA optical test.

Figure 21:
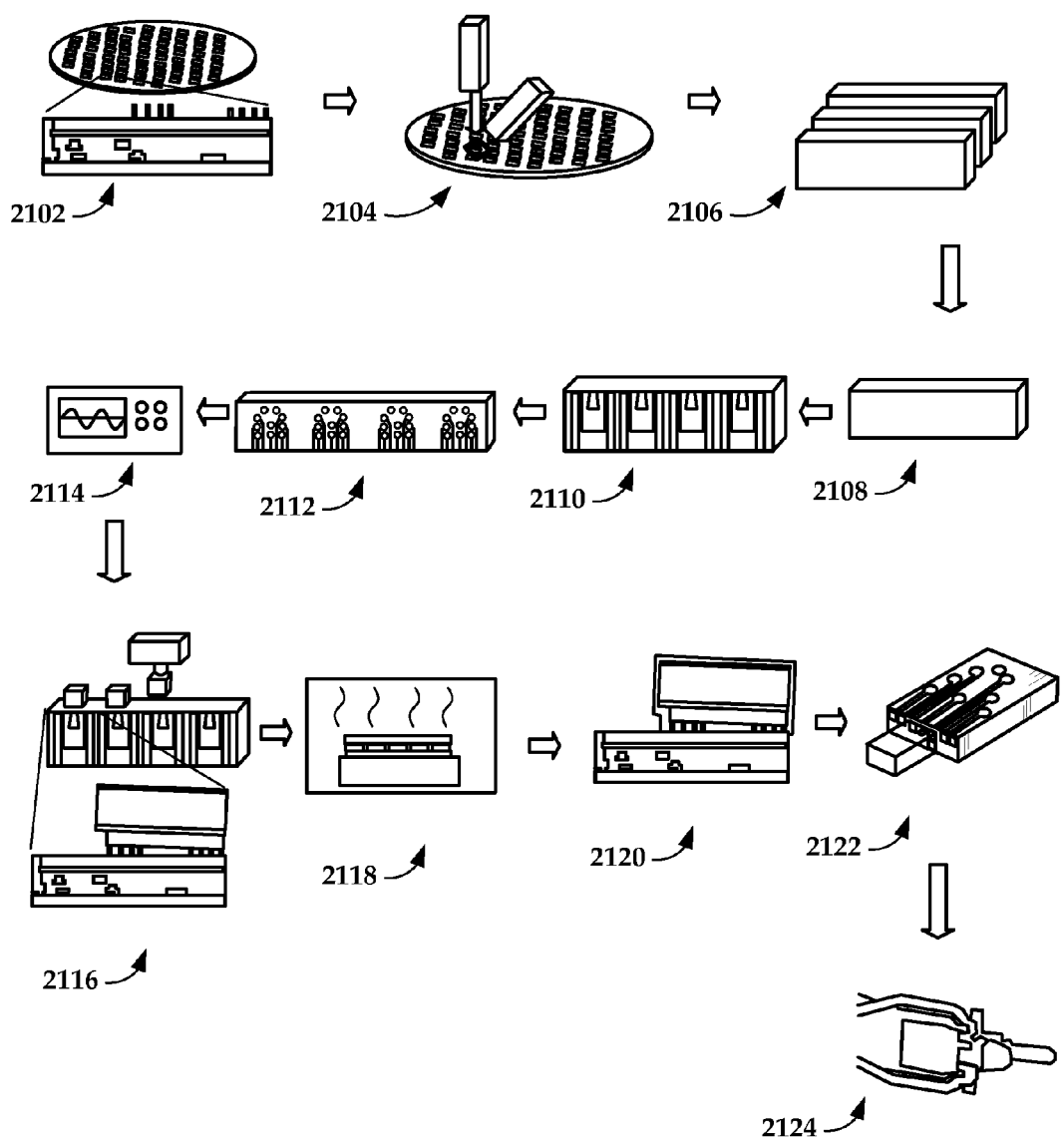
FIG. 21 is a process flow diagram showing more details of the process flow shown in FIG. 20B according to an example embodiment.

In reference now to FIG. 21, a process diagram shows additional details of the wafer-level process flow of FIG. 20B that may be used to create the read/write head reader, HAMR writer, VCSEL assembly, and optics. Process step 2102 includes wafer-level fabrication of read/write head, optical elements, and laser solder. Process step 2104 involves an optional wafer-level optical testing, which may involve testing samples or each every device. Process step 2106 involves slicing the wafer into bars, after which each bar is ground and lapped at process 2108.

At process step 2110, head overcoat and air bearing patterning are deposited to the bars. Top bond patterning/deposition is performed at 2112, after which electrical testing 2114 of the read/write heads may be performed. At process step 2116, bar-level pick and place tacks the laser diode into position, after which batch solder reflow 2118 may be performed in a vacuum and/or active environment. At optional process step 2120, encapsulating and/or thermal cooling material may be deposited/patterned to cover the VCSEL on the read/write heads. Process step 2122 may involve remount, dice, dismount, and clean of the individual slider assemblies. Process step 2124 may involve top bond pad head-gimbal assembly.

Unlike heads that utilize an edge-firing laser, these processes for attaching a VCSEL or the like does not require forming a cavity with sacrificial material that is cleared out prior to laser attach. After laser attach and reflow self align, an optional laser encapsulation method may be done if such encapsulation is not integrated into the laser bonding/attach process itself.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   forming, in order on a substrate, a thermal stud, a shield, an electrical insulation layer, and an electrode;
   forming a sacrificial fill feature on the electrode;
   depositing a fill layer around the sacrificial fill feature;
   removing the sacrificial fill feature to define a cavity in the fill layer;
   forming a solder bump on the electrode after removing the sacrificial fill feature; and
   filling the cavity with a second sacrificial fill to protect the solder bump during subsequent processing.

2. The method of claim 1, further comprising forming a mechanical stopper at a location corresponding to a bottom of the cavity before forming the sacrificial fill feature, wherein a first portion of the sacrificial fill feature encompasses the mechanical stopper.

3. The method of claim 2, further comprising planarizing the fill layer to establish a reference surface that is defined by the mechanical stopper.

4. The method of claim 3, further comprising forming a second portion of the sacrificial fill feature that covers the mechanical stopper.

5. The method of claim 3, further comprising depositing optical layers on the reference surface, the optical layers comprising a waveguide core, and wherein a vertical spacing between the mechanical stopper and the waveguide core is defined by a process used to deposit the optical layers.

6. The method of claim 5, further comprising:
   forming a solder bump on the electrode after removing the sacrificial fill feature;
   tacking a laser diode into the cavity, the laser diode comprising a solder pad configured to interface with the solder bump; and
   performing a reflow operation that reshapes the solder bump so that the laser diode contacts the mechanical stopper and brings an output facet of the laser diode into alignment with the waveguide core.

7. The method of claim 6, wherein the laser diode comprises an edge firing laser diode.

8. A method comprising:
   forming, in order on a substrate, a thermal stud, a shield, an electrical insulation layer, and an electrode;
   forming a sacrificial fill feature on the electrode;
   depositing a fill layer around the sacrificial fill feature;
   removing the sacrificial fill feature to define a cavity in the fill layer;
   forming a second insulation layer over the electrode;
   forming vias in the second insulation layer; and
   forming a plurality of solder bumps on the electrode through the vias.

9. The method of claim 1, wherein the thermal stud comprises an array of thermal studs, the method further comprising forming electrical pathways between individual ones of the array of thermal studs.

10. The method of claim 1, wherein the fill layer comprises alumina.

11. A method comprising:
    forming, in order on a substrate, a thermal stud, a shield, an electrical insulation layer, an electrode, and a mechanical stopper;
    forming a sacrificial fill feature around the mechanical stopper;
    depositing a fill layer around the sacrificial fill feature;
    planarizing the fill layer to establish a reference surface that is defined by the mechanical stopper; and
    removing the sacrificial fill feature to define a cavity in the fill layer.

12. The method of claim 11, further comprising forming a second portion of the sacrificial fill feature that covers the mechanical stopper.

13. The method of claim 11, further comprising depositing optical layers on the reference surface, the optical layers comprising a waveguide core, and wherein a vertical spacing between the mechanical stopper and the waveguide core is defined by a process used to deposit the optical layers.

14. The method of claim 13, further comprising:
    forming a solder bump on the electrode after removing the sacrificial fill feature;
    tacking a laser diode into the cavity, the laser diode comprising solder pads configured to interface with the solder bump; and
    performing a reflow operation that reshapes the solder bump so that the laser diode contacts the mechanical stopper and brings an output facet of the laser diode into alignment with the waveguide core.

15. The method of claim 14, wherein the laser diode comprises an edge firing laser diode.

16. The method of claim 11, further comprising:
    forming a solder bump on the electrode after removing the sacrificial fill feature; and
    filling the cavity with a second sacrificial fill to protect the solder bump during subsequent processing.

17. The method of claim 11, wherein the thermal stud comprises an array of thermal studs, the method further comprising forming electrical pathways between individual ones of the array of thermal studs.

18. The method of claim 11, further comprising, after removing the sacrificial fill feature:
    forming a second insulation layer over the electrode;
    forming vias in the second insulation layer; and
    forming a plurality of solder bumps on the electrode through the vias.

19. The method of claim 11, wherein the fill layer comprises alumina.

* * * * *